(12) United States Patent
Hyo

(10) Patent No.: US 9,686,147 B2
(45) Date of Patent: Jun. 20, 2017

(54) REMOTE MANAGEMENT SYSTEM AND SERVICE PROVIDING APPARATUS

(71) Applicant: Kiyohiro Hyo, Tokyo (JP)

(72) Inventor: Kiyohiro Hyo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 272 days.

(21) Appl. No.: 14/450,640

(22) Filed: Aug. 4, 2014

(65) Prior Publication Data

US 2015/0039741 A1    Feb. 5, 2015

(30) Foreign Application Priority Data

Aug. 2, 2013   (JP) ................. 2013-161341
Jul. 23, 2014  (JP) ................. 2014-149591

(51) Int. Cl.
G06F 15/173    (2006.01)
H04L 12/24     (2006.01)
H04L 29/08     (2006.01)

(52) U.S. Cl.
CPC ............. *H04L 41/24* (2013.01); *H04L 41/04* (2013.01); *H04L 67/1002* (2013.01)

(58) Field of Classification Search
CPC ...... H04L 41/24; H04L 41/04; H04L 67/1002
USPC ................. 709/223, 224, 201, 203
See application file for complete search history.

(56) References Cited

U.S. PATENT DOCUMENTS

| 7,480,937 B2 | 1/2009 | Imai | |
| 2004/0003058 A1* | 1/2004 | Trossen | H04L 29/06027 709/220 |
| 2009/0106418 A1* | 4/2009 | Imai | H04L 12/2602 709/224 |
| 2012/0147420 A1* | 6/2012 | Nishimi | G06F 3/1204 358/1.15 |
| 2013/0246599 A1* | 9/2013 | Yan | H04L 41/0206 709/223 |
| 2015/0234621 A1* | 8/2015 | Kimura | G06F 3/1203 358/1.15 |

FOREIGN PATENT DOCUMENTS

| JP | 2003-330823 | 11/2003 |
| JP | 2013-197731 | 9/2013 |

* cited by examiner

*Primary Examiner* — Liangche A Wang
*Assistant Examiner* — Kaylee Huang
(74) *Attorney, Agent, or Firm* — Harness, Dickey & Pierce, P.L.C.

(57) ABSTRACT

A remote management system includes a service providing apparatus enabling access to a providing source that provides a service and a management apparatus managing an apparatus via a network. Further the service providing apparatus includes a generation unit generating an acquisition request command and a response unit transmitting a response in combination with the acquisition request command. The management apparatus includes a registration unit registering the apparatus information of the apparatus in association with the identification information and a management unit managing the apparatus using the apparatus information registered by the registration unit.

15 Claims, 16 Drawing Sheets

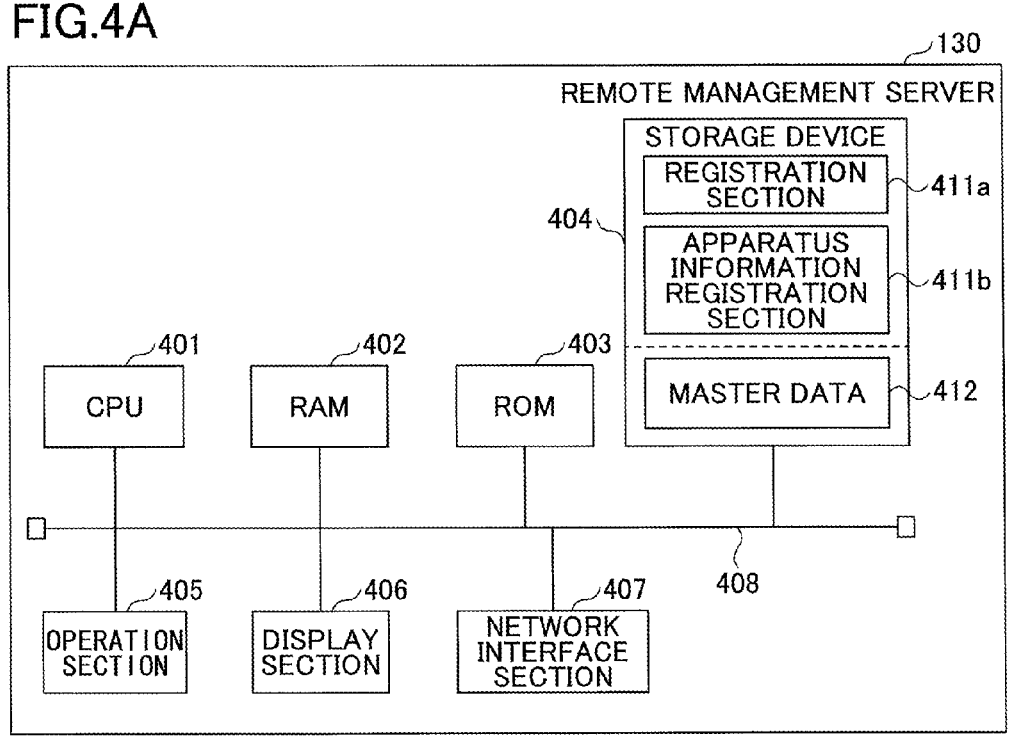

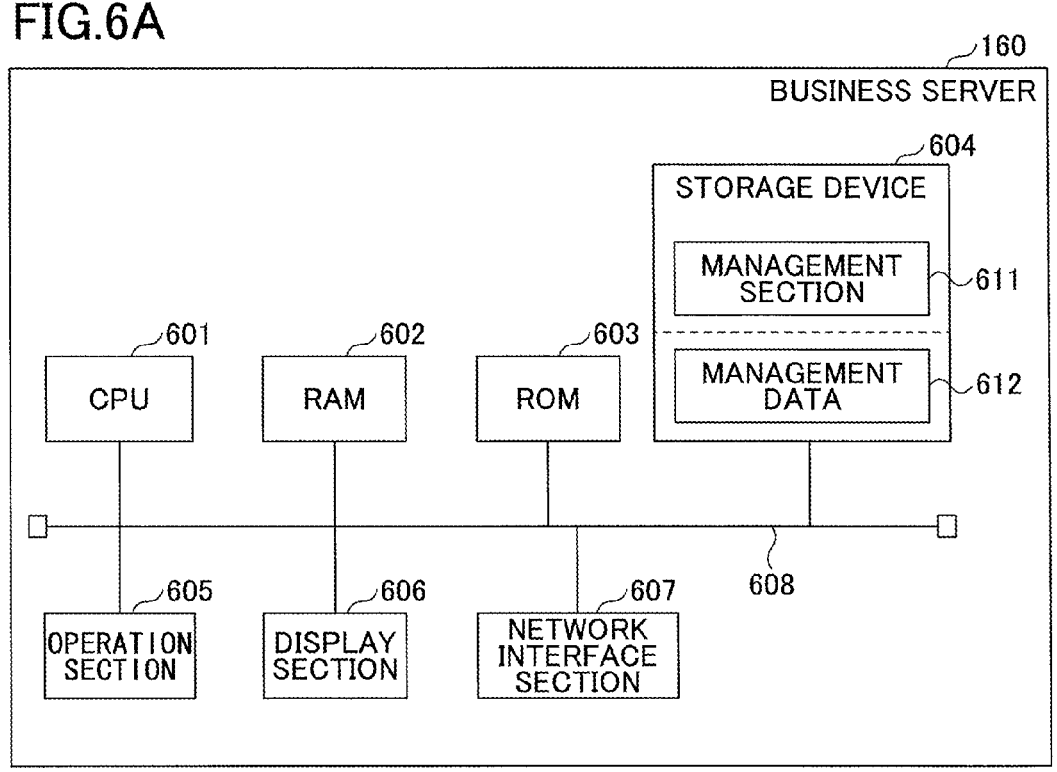

REMOTE MANAGEMENT SYSTEM AND SERVICE PROVIDING APPARATUS

CROSS-REFERENCE TO RELATED APPLICATIONS

The present application is based on and claims the benefit of priority under 35 U.S.C §119 of Japanese Patent Application Nos. 2013-161341 filed Aug. 2, 2013 and 2014-149591 filed Jul. 23, 2014, the entire contents of which are hereby incorporated herein by reference.

BACKGROUND OF THE INVENTION

1. Field of the Invention

The present invention generally relates to a remote management system and a service providing apparatus.

2. Description of the Related Art

Conventionally, there has been known a remote management system in which various apparatuses such as a copier, a projector, etc., are connected to a network to provide a remote management service to manage the various apparatuses using a management apparatus.

Generally, in order to start a remote management service to perform management on the various apparatuses using the management apparatus, it is required to connect the various apparatuses to a network and operate to register the apparatus information of the various apparatuses into the management apparatus (hereinafter referred to as an "installation operation"). This is because, so far, a skilled operator, who is called a "custom engineer" or the like, visits the installation site of the various apparatuses to perform the installation operation.

SUMMARY OF THE INVENTION

According to an aspect of the present invention, a remote management system includes a service providing apparatus enabling access to a providing source that provides a service; and a management apparatus managing an apparatus connected to the management apparatus via a network.

Further the service providing apparatus includes a generation unit generating an acquisition request command to acquire apparatus information of the apparatus after identification information indicating that the apparatus is to be managed by the management apparatus is registered in the management apparatus; and a response unit transmitting, when a use request for using the service is received from the apparatus, a response in combination with the acquisition request command in response to the use request, and the management apparatus includes a registration unit registering the apparatus information of the apparatus, the apparatus information being transmitted from the apparatus to the management apparatus in response to the acquisition request command included in the response, in association with the identification information, and a management unit managing the apparatus using the apparatus information registered by the registration unit.

BRIEF DESCRIPTION OF THE DRAWINGS

Other objects, features, and advantages of the present invention will become more apparent from the following description when read in conjunction with the accompanying drawings, in which:

FIG. 4A illustrates an example configuration of a remote management server 130;

FIG. 4B illustrates an example of master data 412 stored in the remote management server 130;

FIG. 6A illustrates an example configuration of a business server 160;

FIG. 6B illustrates an example of management data 612 stored in the business server 160;

DETAILED DESCRIPTION OF THE PREFERRED EMBODIMENTS

Figure 1:
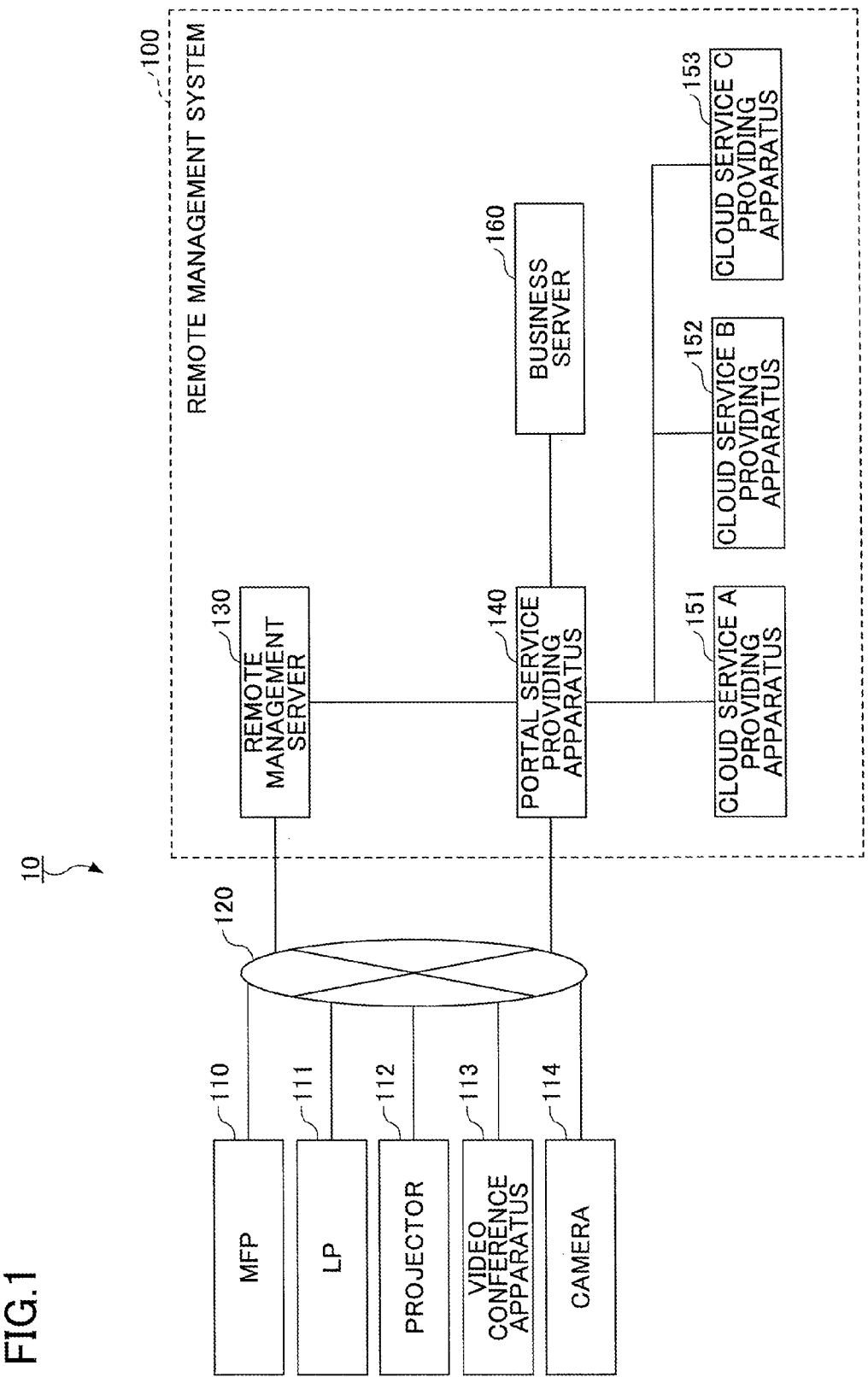
FIG. 1 illustrates an example configuration of a network system 10 including a remote management system 100 according to an embodiment.

In related art technologies, if it is desired that an expert operator is to perform the installation operation whenever a user who wants to receive a remote management service purchases an apparatus, with an increase of the number of users who want to receive a remote management service, it becomes difficult to secure sufficient numbers of such expert operators and it becomes inevitable for cost to increase.

Also, if it is not possible for a user to receive a remote management service until the installation operation by an expert operator is completed, it is not convenient for the user.

In this regard, in a remote management system, it is desired to simplify the installation operation so that the remote management service can be started without such an expert operator.

The present invention is made in light of the above problem, and may provide, for example, a remote management system in which the installation operation is simplified.

According to an embodiment of the present invention, it becomes possible to simplify the installation operation in a remote management system.

In the following, embodiments of the present invention are described with reference to the accompanying drawings. Note that, in the description and the figures, the same reference numerals are repeatedly used to describe substantially the same elements and repeated descriptions thereof may be omitted.

First Embodiment

Example Configuration of a Network System Including a Remote Management System

First, an example configuration of a network system including a remote management system according to an embodiment is described. FIG. 1 illustrates an example entire configuration of a network system 10 including a remote management system 100 according to an embodiment.

As illustrated in FIG. 1, in the network system 10, it is possible for various apparatuses to connect to a network 120. In the example of FIG. 1, the various apparatuses are a Multi Function Peripheral (MFP) 110, a Laser Printer (LP) 111, a projector 112, a video conference apparatus 113, and a camera 114, which are connected to the network 120. Note that the various apparatuses to be connected to the network 120 are not limited to those apparatus illustrated in FIG. 1. Namely, any other apparatus(es) may be used.

Here, it is assumed that any of the various apparatuses 110 through 114 can receive a Cloud service described below via the network 120. Also, it is assumed that any of the various apparatuses 110 through 114 can receive a remote management service described below via the network 120.

Hereinafter, among the various apparatuses connected to the network 120, an apparatus that receives the remote management service on a contract basis with a service provider is especially called an "apparatus to be managed". In the example of FIG. 1, it is assumed that the MFP 110 is the apparatus to be managed. Hereinafter, for explanatory purposes, it is assumed that the "apparatus to be managed" is the MFP 110. However, needless to say, any of the other apparatuses 111 through 114 may be the apparatus to be managed. Further, it is also needless to say that the apparatus to be managed is not limited to any of the apparatuses 110 through 114 in FIG. 1. For example, the apparatus to be managed may be any of various apparatuses including a smart device such as a smartphone, an electronic board, etc.

On the other hand, the remote management system 100 includes a remote management server 130, a portal service providing apparatus 140, and a business server 160 (FIG. 1). The remote management system 100 further includes a Cloud service A providing apparatus 151, a Cloud service B providing apparatus 152, and a Cloud service C providing apparatus 153 for providing a Cloud service A, a Cloud service B, and a Cloud service C, respectively.

The remote management server 130 is a management apparatus that provides the remote management service to the apparatus to be managed (i.e., the MFP 110). The remote management server 130 manages, for example, the attribute of the user who owns the apparatus to be managed (MFP 110), the attribute of the apparatus to be managed (MFP 110), and an identification number to identify the contract of the remote management service.

The portal service providing apparatus 140 is a providing source of providing the Cloud services A through C, and provides the web sites to access the Universal Resource Locators (URLs) of the Cloud service providing apparatuses 151 through 153.

The Cloud service A providing apparatus 151, the Cloud service B providing apparatus 152, and the Cloud service C providing apparatus 153 provide respective Cloud services. Here, the services that are provided as the Cloud services A through C includes various services such as, for example, a Cloud print service, a Cloud scanner service, a Cloud storage service, and a Cloud video conference system service.

In the example of FIG. 1, a case is described where different Cloud service providing apparatuses 151 through 153 provide different Cloud services A through C, respectively. However, the present invention is not limited to this configuration. For example, a single Cloud service providing apparatus may provide different Cloud services A through C.

Further, in the example of FIG. 1, a case us described where the portal service providing apparatus 140 and the Cloud service providing apparatuses 151 through 153 providing respective Cloud services A through C have respective separate bodies. However, the present invention is not limited to this configuration. For example, the Cloud services A through C may be provided by the portal service providing apparatus 140.

The business server 160 is the server that manages, for example, the attribute of the user, the attributes of the various apparatuses, and types of the Cloud services that can be received by the various apparatuses.

Functional Configuration of the Apparatus to be Managed

Figure 2:
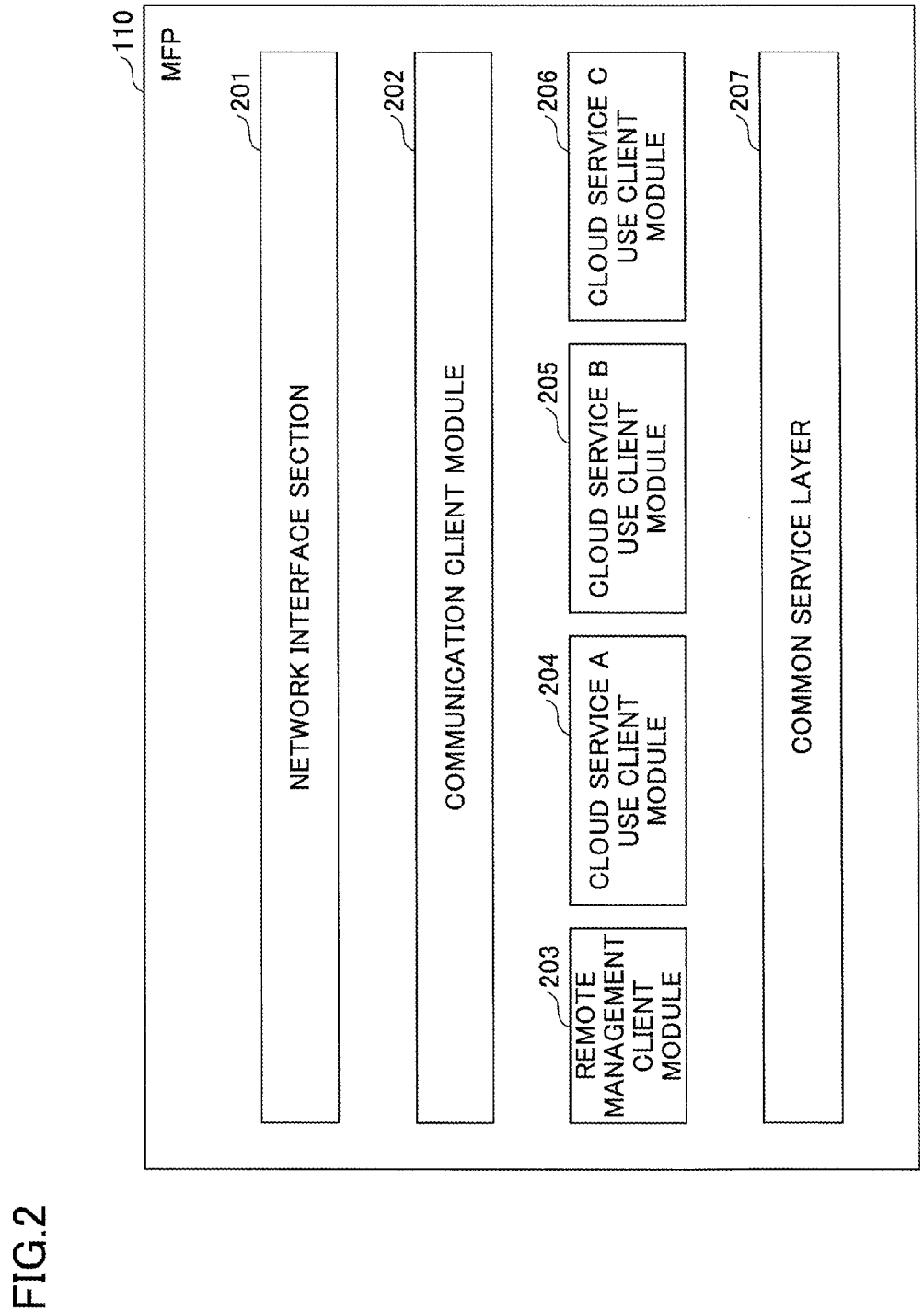
FIG. 2 illustrates an example functional configuration of an apparatus to be managed (MFP 110)

Next, an example of the Functional configuration of the apparatus to be managed is described. FIG. 2 illustrates an example functional configuration of the MFP 110 which is the "apparatus to be managed". As illustrated in FIG. 2, the MFP 110 includes a network interface section 201 to connect to the network 120. The MFP 110 further includes a communication client module 202 for communications with various devices included in the remote management system 100 via the network 120 connected by the network interface section 201.

The communication client module 202 has, for example, a browser function to acquire and display the Web content provided by the apparatuses included in the remote management system 100.

The MFP 110 further includes a remote management client module 203. The remote management client module 203 is a module dedicated to the communications with the remote management server 130. After the remote management service is started, the remote management client module 203 transmits the information relevant to the inner state of the MFP 110, which is periodically collected, to the remote management server 130 via the communication client module 202. Further, the remote management client module 203 receives an instruction transmitted from the remote management server 130 via the communication client module 202.

The MFP 110 further includes a Cloud service A use client module 204, a Cloud service B use client module 205, and a Cloud service C use client module 206. The Cloud service A use client module 204, the Cloud service B use client module 205, and the Cloud service C use client module 206 are modules dedicated to the communication with the Cloud service A providing apparatus 151, the Cloud service B providing apparatus 152, and the Cloud service C providing apparatus 153, respectively. When those modules 204 through 206 are in communication with the Cloud service providing apparatuses 151 through 153, respectively, it becomes possible to receive the Cloud services A through C.

The MFP 110 further includes a common service layer 207. The common service layer 207 executes the remote management service and the Cloud services A through C provided based on the communications by the respective modules 203 through 206.

Connection Configuration of the Remote Management System

Figure 3:
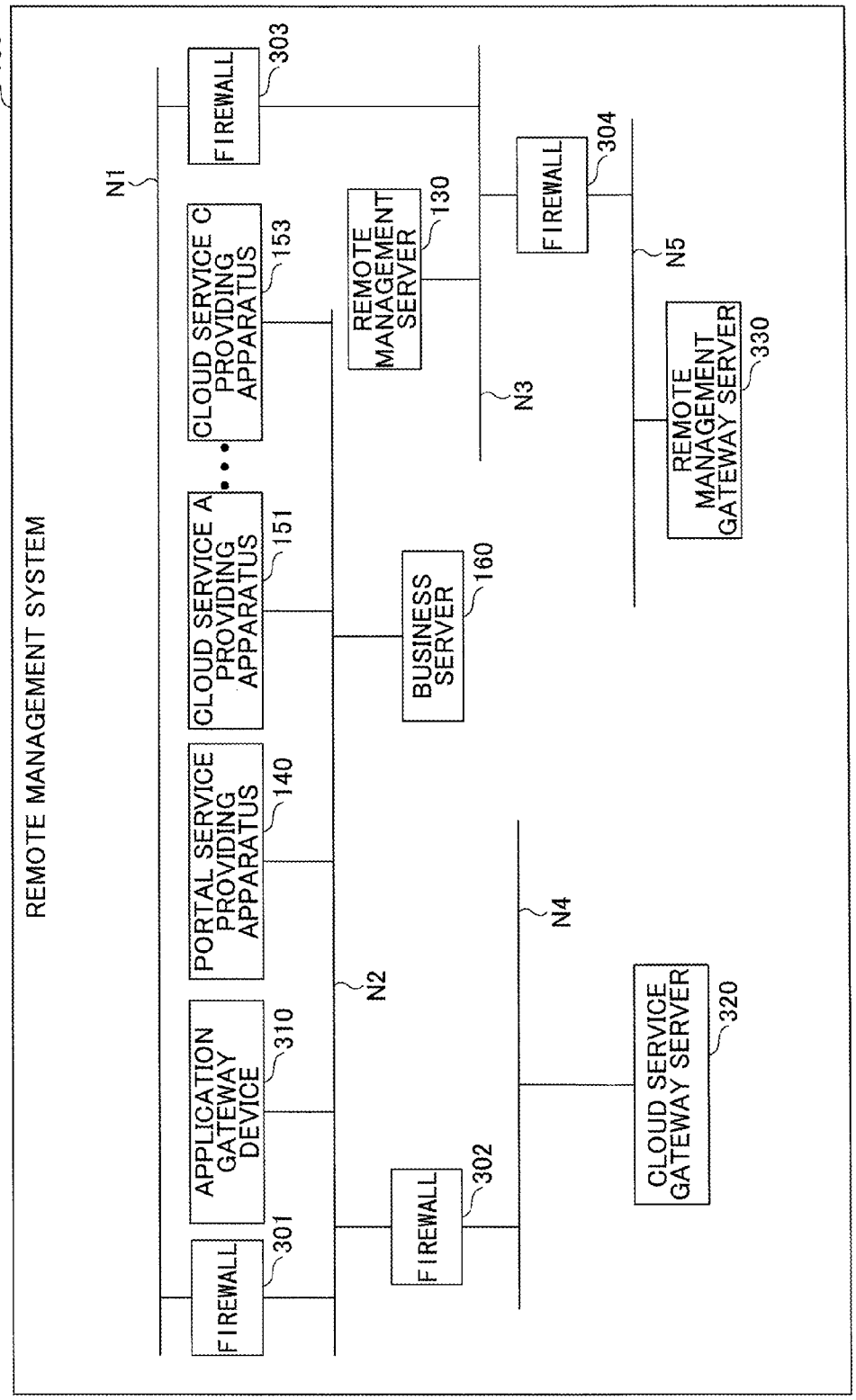
FIG. 3 illustrates an example connection in the remote management system 100 according to an embodiment.

Next, an example connection of the apparatuses included in the remote management system 100 is described. FIG. 3 illustrates an example connection of the apparatuses included in the remote management system 100. As illustrated in FIG. 3, the remote management system 100 includes networks N1 through N5. The network N1 is connected to the network N2 via a firewall 301, and is further connected to the network N3 via a firewall 303.

The network N2 is connected to each of an application gateway device 310, the portal service providing apparatus 140, the Cloud service A providing apparatus 151, the Cloud service B providing apparatus 152, and the Cloud service C providing apparatus 153.

The network N3 is connected to the remote management server 130. The network N3 is connected to the network N5 via a firewall 304. The network N5 is connected to a remote management gateway server 330.

On the other hand, the network N2 is connected to the network N4 via a firewall 302. The network N4 is connected to a Cloud service gateway server 320.

As described above, the remote management system 100 includes plural networks via firewalls, so that the networks includes respective apparatuses included in the remote management system 100.

Descriptions of a Configuration of the Remote Management Server and Master Data

Next, an example hardware configuration of the remote management server 130 and master data 412 stored in the remote management server 130 are described.

FIG. 4A illustrates an example hardware configuration of the remote management server 130. As illustrated in FIG. 4A, the remote management server 130 includes a Central Processing Unit (CPU) 401, a Random Access Memory (RAM) 402, a Read Only Memory (ROM) 403, a storage device 404, an operation section 405, a display section 406, and a network interface section 407, which are connected to each other via a bus 408.

The CPU 401 executes a program to serve as a registration section 411a and an apparatus information registration section 411b (in FIG. 4A, the program to be executed after the remote management service is started to realize various functions is omitted (not shown)). The registration section 411a and the apparatus information registration section 411b register various types of information into the master data 412 when the remote management service is started.

The RAM 402 provides a working area when the program to be functioned as the registration section 411a and the apparatus information registration section 411b is executed by the CPU 401. The ROM 403 stores various programs and data which are necessary to execute the program to be functioned as the registration section 411a and the apparatus information registration section 411b by the CPU 401.

The storage device 404 stores the program to be functioned as the registration section 411a and the apparatus information registration section 411b and further stores the master data 412. The master data 412 is a database to manage, for example, the attribute of the user who owns the apparatus to be managed to receive the remote management service, the attribute of the apparatus to be managed, and the identification number to identify the contract of the remote management service.

The operation section 405 can be used when, for example, the manager of the remote management server 130 registers various information into the master data 412 in a case where a user purchases or rents an apparatus to be managed. The display section 406 provides, for example, a display screen so that the various information can be registered into the master data 412.

The network interface section 407 communicates with the apparatus to be managed via the network 120 and also communicates with, for example, the portal service providing apparatus 140 and the Cloud service providing apparatuses 151 through 153 via the networks N1 and N2.

Next, the master data 412 stored in the storage device 404 of the remote management server 130 is described with reference to FIG. 4B. As illustrated in FIG. 4B, the master data 412 includes columns of a user name 421, an equipment number 422, a service identification number 423, apparatus information 424, and a management flag 425.

In the user name 421, a user name of the user who purchased or rents the apparatus to be managed is registered.

In the equipment number 422, a unique identifier appended to the apparatus to be managed is registered. In the service identification number 423, the identification information is registered which is appended to the apparatus to be managed based on a contract for the remote management service when the user purchases or rents the apparatus to be managed. Namely, the service identification number refers to the identification information indicating that the apparatus to be managed is contracted to be remotely managed.

As described above, the user name 421, the equipment number 422, and the service identification number 423 are registered by a manager of the remote management server 130 via the operation section 405 when a user purchases or rents the apparatus to be managed. Here, it is assumed that the equipment number 422 and the service identification number 423 are provided from the service provider to the user when the user purchase or rents the apparatus to be managed and stored by the user side.

The apparatus information 424 is acquired by the apparatus to be managed when there is a request for starting the remote management service, and is transmitted from the apparatus to be managed so as to be registered. The apparatus information 424 refers to the information indicating the attribute of the apparatus to be managed. The apparatus information 424 includes, for example, the information indicating the installation location of the apparatus to be managed, the information indicating the configuration of the apparatus to be managed, and the information indicating the version of the firmware of the apparatus to be managed. By registering the apparatus information 424 into the master data 412, it becomes possible for the remote management server 130 to start the remote management service to the apparatus to be managed using the apparatus information 424.

The management flag 425 is the flag to manage (indicate) whether the remote management service is started for the apparatus to be managed registered into the master data 412. When a process for starting the remote management service is executed, the management flag 425 of the apparatus to be managed is set to "ON".

As illustrated in FIG. 4B, in the master data 412, all the apparatuses to be managed are registered for each of the users (in the example of FIG. 4B, the users are "A company" and "B company"). Further, in the example of FIG. 4B, "A company" has two MFPs as the apparatuses to be managed. Here, it is assumed that the MFP 110 in FIG. 1 corresponds to the equipment number="77X-7654321".

Figure 5A:
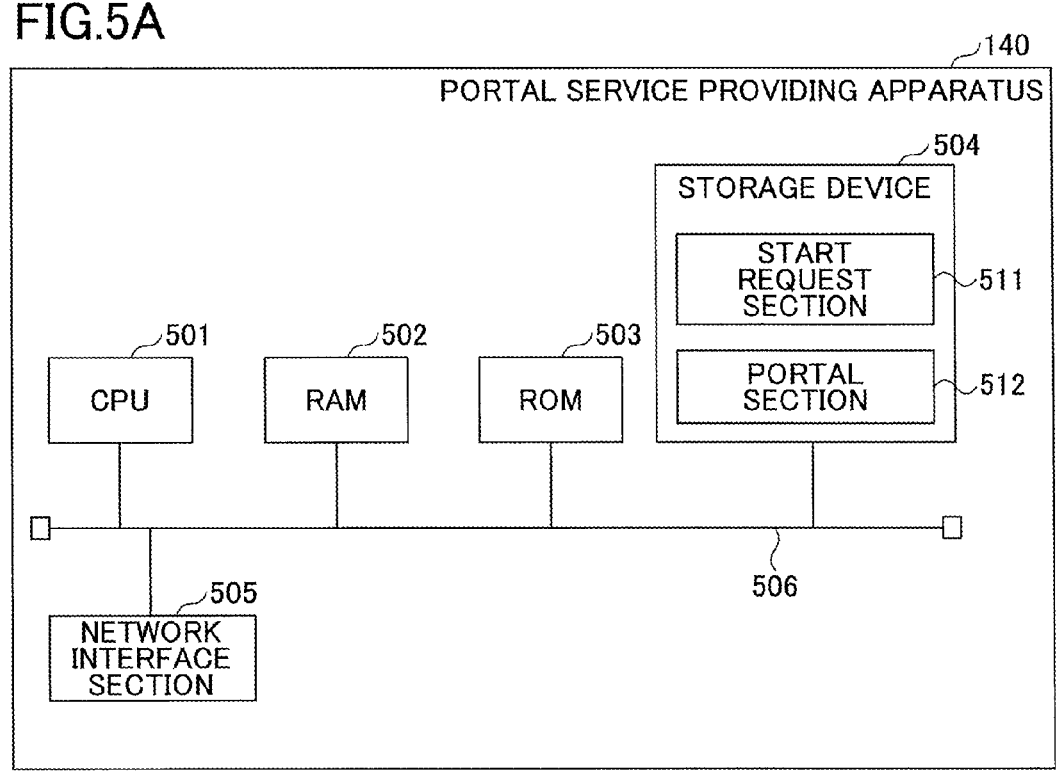
FIG. 5A illustrates an example configuration of a portal service providing apparatus 140.

Descriptions of a Configuration of the Portal Service Providing Apparatus and an User Interface Next, an example hardware configuration of the portal service providing apparatus 140 and the user interface provided by the portal service providing apparatus 140 are described. FIG. 5A illustrates an example hardware configuration of the portal service providing apparatus 140.

As illustrated in FIG. 5A, the portal service providing apparatus 140 includes a CPU 501, a RAM 502, a ROM 503, a storage device 504, and a network interface section 505, which are connected to each other via a bus 506.

The CPU 501 executes a program that is stored in the storage device 504 and is functioned as a start request section 511 and a portal section 512.

The start request section 511 executes a process for staring the remote management service. The portal section 512 executes the process for providing the Cloud service.

The RAM 502 provides a working area when the program to be functioned as the start request section 511 and the portal section 512 is executed by the CPU 501. The ROM 503 stores various programs and data which are necessary to execute the program to be functioned as the start request section 511 and the portal section 512 by the CPU 501.

The storage device 504 stores the program to be functioned as the start request section 511 and the portal section 512.

The network interface section 505 communicates with the various apparatuses via the network 120, and further communicates with the remote management server 130 and the Cloud service providing apparatuses 151 through 153 via the networks N1 and N2.

Figure 5B:
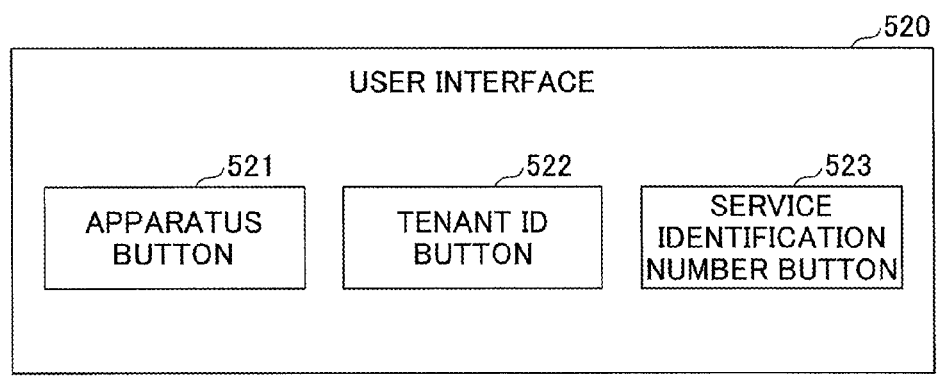
FIG. 5B illustrates an example user interface 520 provided by the portal service providing apparatus 140.

FIG. 5B illustrates an example of a user interface 520 which is provided by the portal service providing apparatus 140. The user interface 520 can be browsed when the user of the various apparatuses 110 through 114 accesses the portal service providing apparatus 140 via a terminal having a browsing function. Here, it is to be noted that the terminal for browsing the user interface 520 may be a terminal (not shown in FIG. 1). Also, the user interface 520 may be browsed via an apparatus having the browsing function among the various apparatuses 110 through 114 of FIG. 1.

As illustrated in FIG. 5B, the user interface 520 includes an apparatus button 521, a tenant ID button 522, and a service identification number button 523.

The user of the various apparatuses 110 through 114 can request for displaying a list of the various apparatuses and a request for using the Cloud service by pressing the respective buttons on the user interface 520 provided by the portal service providing apparatus 140. Further, the user of the apparatus to be managed (MFP 110) can request for starting the remote management service by pressing the button(s) on the user interface 520 provided by the portal service providing apparatus 140.

The apparatus button 521 is the button to display a list of the various apparatuses owned by the user. When the apparatus button 521 is pressed, the portal service providing apparatus 140 acquires the list of the apparatuses owned by the user from the business server 160 and transmits the list of the apparatuses to the user. By doing this, the use can browse the list of the various apparatuses owned by the user.

The tenant ID button 522 is the button to request for the use of the Cloud service. By pressing the tenant ID button 522 and inputting the type (tenant ID) of the Cloud service to be used, the user of the various apparatuses can request for the use of the Cloud service to the portal service providing apparatus 140.

The service identification number button 523 is the button to request for starting the remote management service. By pressing the service identification number button 523 and inputting the service identification number, the user of the apparatus to be managed can request for starting the remote management service.

Configuration of the Business Server and the Configuration of Management Data

Next, an example configuration of the business server 160 and management data 612 stored in the business server 160 are described.

FIG. 6A illustrates an example hardware configuration of the business server 160. As illustrated in FIG. 6A, the business server 160 includes a CPU 601, a RAM 602, a ROM 603, a storage device 604, an operation section 605, a display section 606, and a network interface section 607, which are connected to each other via a bus 608.

The CPU 601 executes a program that is stored in the storage device 604 and is functioned as a management section 611. The management section 611 manages management data 612.

The RAM 602 provides a working area when the program to be functioned as the management section 611 is executed by the CPU 601. The ROM 603 stores various programs and data which are necessary to execute the program to be functioned as the management section 611 by the CPU 501.

The storage device 604 stores the program to be functioned as the management section 611 and further stores the management data 612. The management data 612 is a database to manage, for example, the attributes of the user, the attributes of the various apparatuses, and the types of the Cloud services to be received by the various apparatuses so that the user of the various apparatuses can receive the Cloud services.

The operation section 605 can be used when, for example, the manager of the business server 160 registers various information in the management data 612 in a case where a user purchases or rents any of the various apparatuses. The display section 606 provides, for example, a display screen so that the various information can be registered in the management data 612.

The network interface section 607 communicates with, for example, the remote management server 130 and the portal service providing apparatus 140 via the networks N1 and N2.

Next, the management data 612 stored in the storage device 604 of the business server 160 are described with reference to FIG. 6B. As illustrated in FIG. 6B, the management data 612 includes the columns of a user name 621, an equipment number 622, and a tenant ID 623.

In the user name 421, a user name of the user who has purchased or rents the apparatus (various apparatuses) is registered. In the equipment number 422, unique identifiers appended to the various apparatuses are registered. The tenant ID 623 is the identification number indicating the type of the Cloud service received by the apparatus (various apparatuses).

As illustrated in FIG. 6B, in the management data 612, all the various apparatuses are registered for the corresponding users (in the example of FIG. 6B, the users are "A company" and "B company"). Further, in the example of FIG. 63, "A company" has two MFPs, an LP, a projector, a video conference apparatus, and a camera, which correspond to the various apparatuses 110 through 114.

Figure 7:
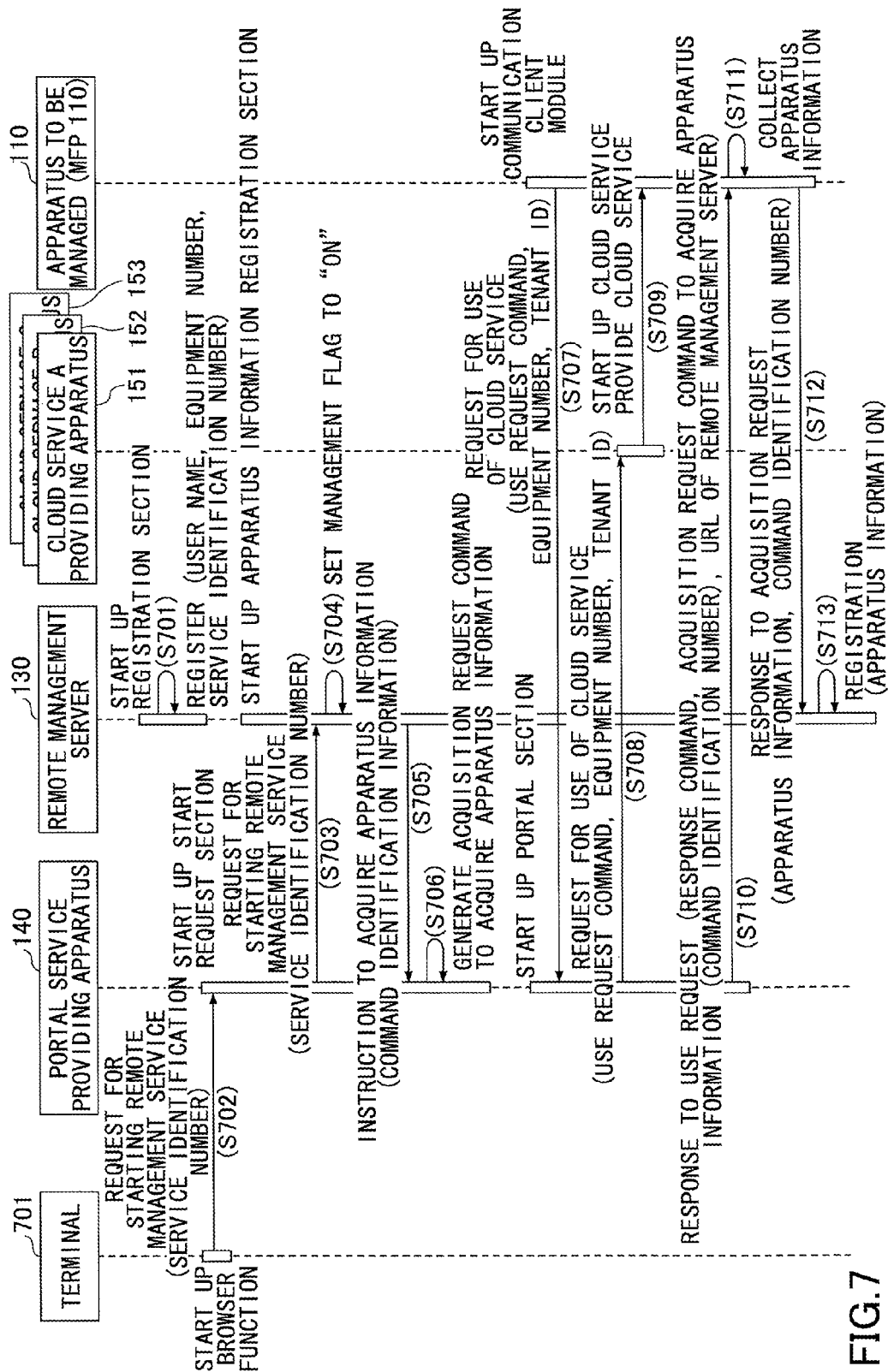
FIG. 7 is a sequence diagram of an example operation during the installation operation.

Description of an Operational Sequence of the Sections During the Installation Operation Next, an operational sequence of the sections during the installation operation is described. FIG. 7 illustrates an example operational sequence of the sections (i.e., the terminal 701, the portal service providing apparatus 140, the remote management server 130, the Cloud service providing apparatuses 151 through 153, and the apparatus to be managed (MFP 110)) during the installation operation.

Further, in the example of FIG. 7, a case is described where the MFP 110 is the apparatus to be managed. However, the present invention may also be applied to a case where any other apparatus is the apparatus to be managed. Further, in the example of FIG. 7, a case is described where a request for starting the remote management service is issued via the terminal 701 of the user. However, the request for starting the remote management service may be issued via the apparatus to be managed (MFP 110). Namely, any other apparatus that can access the portal service providing apparatus 140, or browse the user interface 520 may be used as the apparatus to transmit the request.

If there is a contract to receive the remote management service when a user purchases or rents the apparatus to be managed (MFP 110), the manager of the remote management server 130 starts up the registration section 411*a*, and registers the user name 421, the equipment number 422, and the service identification number 423 into the master data 412 (step S701).

By registering the user name 421, the equipment number 422, and the service identification number 423 into the master data 412 by the manager of the remote management server 130, it becomes possible for a user to perform the installation operation.

To perform the installation operation, first, a user starts up the browsing function of the terminal 701 and accesses the portal service providing apparatus 140, so that the user interface 520 is displayed on the terminal 701.

On the user interface 520 displayed on the terminal 701, the user presses the service identification number button 523. Further, the user inputs the service identification number 423 of the apparatus to be managed (MFP 110) (in the example of FIG. 4, "1234567890" is input) that requests for starting the remote management service. By doing this, the start request section 511 of the portal service providing apparatus 140 is started up. In step S702, a request, including the service identification number 423, for starting the remote management service transmitted from the terminal 701 is received by the portal service providing apparatus 140.

Upon receiving the request, including the service identification number 423, for starting the remote management service, in step S703, the portal service providing apparatus 140 transmits the request for starting the remote management service to the remote management server 130.

Upon receiving the request for starting the remote management service from the portal service providing apparatus 140, the remote management server 130 sets the management flag 425 in the master data 412 to "ON", the management flag 425 being in association with the service identification number 423 included in the request for starting the remote management service (step S704).

Further, in step S705, the remote management server 130 transmits an instruction to the portal service providing apparatus 140 to acquire the apparatus information of the apparatus to be managed (MFP 110) whose management flag 425 is set to "ON". Here, it is assumed that the instruction to acquire the apparatus information transmitted from the remote management server 130 includes a command identification number (command identifier) to identify the instruction.

In step S706, the portal service providing apparatus 140, to which the instruction to acquire the apparatus information is transmitted, generates an acquisition request command, including the command identification number, to acquire the apparatus information. Further, the portal service providing apparatus 140 prepares for adding the generated apparatus information acquisition request to a response command which is the response to the reception of the Cloud service use request command to request for the use of the Cloud service received from the apparatus to be managed (MFP 110), and waits for the reception.

After that, the user starts up the apparatus to be managed (MFP 110) and inputs a request for the use of the Cloud service.

Specifically, the user starts up the communication client module 202 of the apparatus to be managed (MFP 110) and accesses the portal service providing apparatus 140, so that the apparatus to be managed (MFP 110) displays the user interface 520.

Further, on the user interface 520 displayed on the apparatus to be managed (MFP 110), the user presses the apparatus button 521 to select the apparatus that is to receive the Cloud service. Further, the user presses the tenant ID button 522 and inputs the identifier (tenant ID) indicating the type of the desired Cloud service. By doing this, the portal section 512 of the portal service providing apparatus 140 is started up. Then, in step S707, the request for the use of the Cloud service, including the Cloud service use request command, the equipment number, and the tenant ID, transmitted from the apparatus to be managed (MFP 110) is received by the portal service providing apparatus 140.

In step S708, upon receiving the request for the use of the Cloud service, the portal service providing apparatus 140 identifies the Cloud service which is requested to be used based on the tenant ID included in the request for the user of the Cloud service. Further, the portal service providing apparatus 140 transmits the request for the use of the Cloud service to the Cloud service providing apparatus that can provide the identified Cloud service (in this embodiment, any of the Cloud service providing apparatuses 151 through 153).

The one (any) of the Cloud service providing apparatuses 151 through 153 that receives the request for the use of the Cloud service provides the Cloud service to the apparatus to be managed (MFP 110) corresponding to the equipment number included in the request for the use of the Cloud service (step S708).

Further, after the completion of sending the request for the use of the Cloud service to the one of the Cloud service providing apparatuses 151 through 153, the portal service providing apparatus 140 responds to the use requester (step S710). Specifically, the portal service providing apparatus 140 transmits a response command to respond to the use request command to the apparatus to be managed (MFP 110).

In this case, the portal service providing apparatus 140 determines whether the apparatus that transmits the request for the use of the Cloud service in step S707 is the apparatus to be managed (MFP 110) to which the acquisition request command to acquire the apparatus information generated in step S706 is to be transmitted. When determining that the apparatus that transmits the request for the use of the Cloud service is the apparatus to be managed (MFP 110) to which the acquisition request command to acquire the apparatus information is to be transmitted, the portal service providing apparatus 140 adds the acquisition request command to acquire the apparatus information to the response command. The portal service providing apparatus 140 further adds the URL of the remote management server 130.

By doing this, it becomes possible to transmit the acquisition request command to acquire the apparatus information and the URL of the remote management server 130 to the apparatus to be managed (MFP 110), whose apparatus information is to be acquired by the remote management server 130. Further, as described above, the acquisition request command to acquire the apparatus information includes the command identification number. Therefore, when the received apparatus information is associated with the command identification number, the remote management server 130 can recognize that the received apparatus information corresponds to the apparatus information that is to be acquired.

In step S711, upon receiving the response to the request for the use of the Cloud service, the apparatus to be managed (MFP 110) collects the apparatus information of the apparatus to be managed (MFP 110) based on the acquisition request command to acquire the apparatus information which is added to the response command.

Further, in step S712, the apparatus to be managed (MFP 110) transmits the collected apparatus information to the URL of the remote management server 130 as the response to the acquisition request command. In the transmission of the apparatus information, the command identification number, included in the acquisition request command to acquire the apparatus information, in association with the apparatus information is also transmitted.

Upon receiving the apparatus information in association with the command identification number, the remote management server 130 determines whether the received command identification number corresponds to the command identification number which is included in the instruction to acquire the apparatus information which is issued to the portal service providing apparatus 140 (step S713). When determining that the command identification numbers are not the same, the remote management server 130 determines that the received apparatus information does not correspond to the apparatus information to be acquired. On the other hand, when determining that the command identification numbers are the same, the remote management server 130 determines that the received apparatus information corresponds to the apparatus information to be acquired.

When determining that the received apparatus information corresponds to the apparatus information to be acquired, the remote management server 130 registers the received apparatus information into the master data 412 (step S713). In this embodiment, the request for starting the remote management service is issued for the apparatus to be managed whose service identification number 423 is "1234567890". Therefore, the apparatus information received from the apparatus to be managed is associated and stored with the service identification number 423 into the master data 412 (see FIG. 4).

By doing this, the remote management service is started for the apparatus to be managed (MFP 110) having the above service identification number 423.

Figure 8:
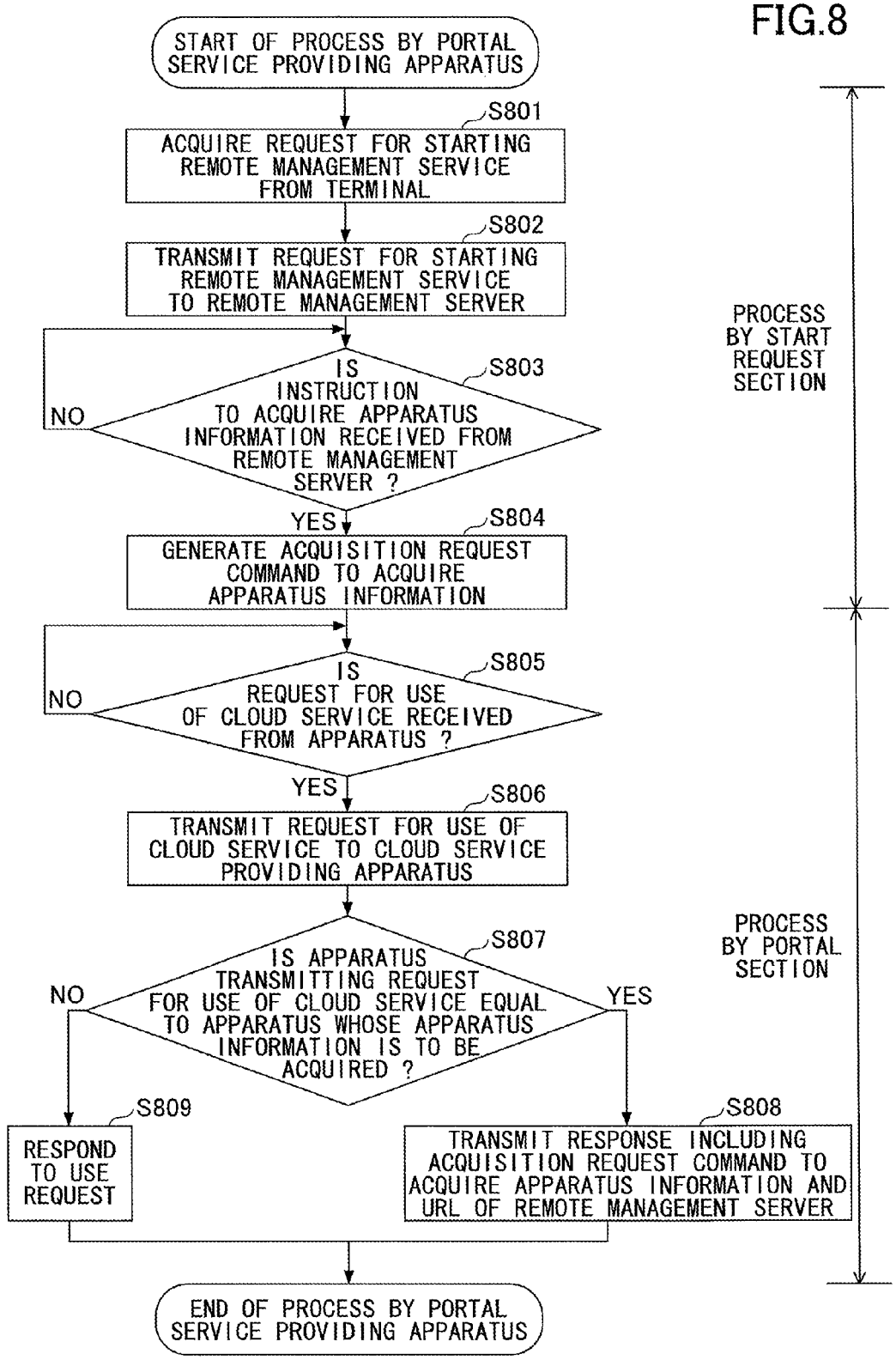
FIG. 8 is a flowchart of an example process performed by the portal service providing apparatus 140 during the installation operation.

Process by the Portal Service Providing Apparatus 140 During the Installation Operation Next, a flow of the process by the portal service providing apparatus 140 during the installation operation is described. FIG. 8 is a flowchart of a process performed by the portal service providing apparatus 140 during the installation operation.

In response to the external access (from the terminal 701), the user interface 520 is provided to the access source (i.e., the terminal 701). Then, when the user presses the service identification number button 523 on the user interface 520, the start request section 511 is started up.

Then, when the user transmits the request for starting the remote management service including the service identification number 423, the portal service providing apparatus 140 acquires (receives) the request (in step S801).

In step S802, the portal service providing apparatus 140 transmits the request for starting the remote management service including the service identification number 423 to the remote management server 130.

In step S803, as the response to the request for starting the remote management service, the portal service providing apparatus 140 determines whether the portal service providing apparatus 140 receives the instruction to acquire the apparatus information from the remote management server 130. When determining that the instruction to acquire the apparatus information is not received (NO in step S803), the portal service providing apparatus 140 further waits for the reception of the instruction to acquire the apparatus information.

On the other hand, when determining that the instruction to acquire the apparatus information is received from the remote management server 130 by the portal service providing apparatus 140 (YES in step S803), the process goes to step S804. In step S804, the portal service providing apparatus 140 generates the acquisition request command to acquire the apparatus information which is to be included in the request for the use of the Cloud service when the request is received from the apparatus to be managed to which the remote management service is to be provided.

Here, the instruction to acquire the apparatus information from the remote management server 130 includes the command identification number to identify the instruction. Therefore, in step S804, the portal service providing apparatus 140 generates the acquisition request command to acquire the apparatus information that includes the command identification number.

Next, in order to use the Cloud service, the user accesses the portal service providing apparatus 140 and performs a predetermined operation to start the portal section 512.

In step S805, the portal service providing apparatus 140 determines whether the request for the use of the Cloud service is received from the apparatus. When determining that the request for the use of the Cloud service is not received (NO in step S805), the portal service providing apparatus 140 further waits for the reception of the request for the use of the Cloud service.

On the other hand, when determining that the request for the use of the Cloud service is received (YES in step S805), the process goes to step S806. In step S806, the portal service providing apparatus 140 transmits the request for the use of the Cloud service to the Cloud service providing apparatus that provides the Cloud service corresponding to the tenant ID included in the request for the use of the Cloud service.

Further, in step S807, the portal service providing apparatus 140 determines whether the apparatus that transmits the request for the use of the Cloud service is the apparatus to be managed whose apparatus information is to be acquired.

Specifically, the portal service providing apparatus 140 determines whether the equipment number 422 included in the request for the use of the Cloud service corresponds to the equipment number 422 of the apparatus to be managed to which the generated acquisition request command to acquire the apparatus information is to be transmitted. When determining that the equipment numbers 422 are the same (YES in step S807), the process goes to step S808.

In step S808, as the response to the request for the use of the Cloud service, the portal service providing apparatus 140 transmits the response command in association with the acquisition request command to acquire the apparatus information generated in step S804 and the URL of the remote management server 130 to the apparatus to be managed which is the request source of the request for the use of the Cloud service.

On the other hand, when determining that the equipment numbers 422 are not the same (NO in step S807), the process goes to step S809. In step S809, as the response to the request for the use of the Cloud service, the portal service providing apparatus 140 transmits a response command to the apparatus that is the request source of the request for the use of the Cloud service.

Figure 9:
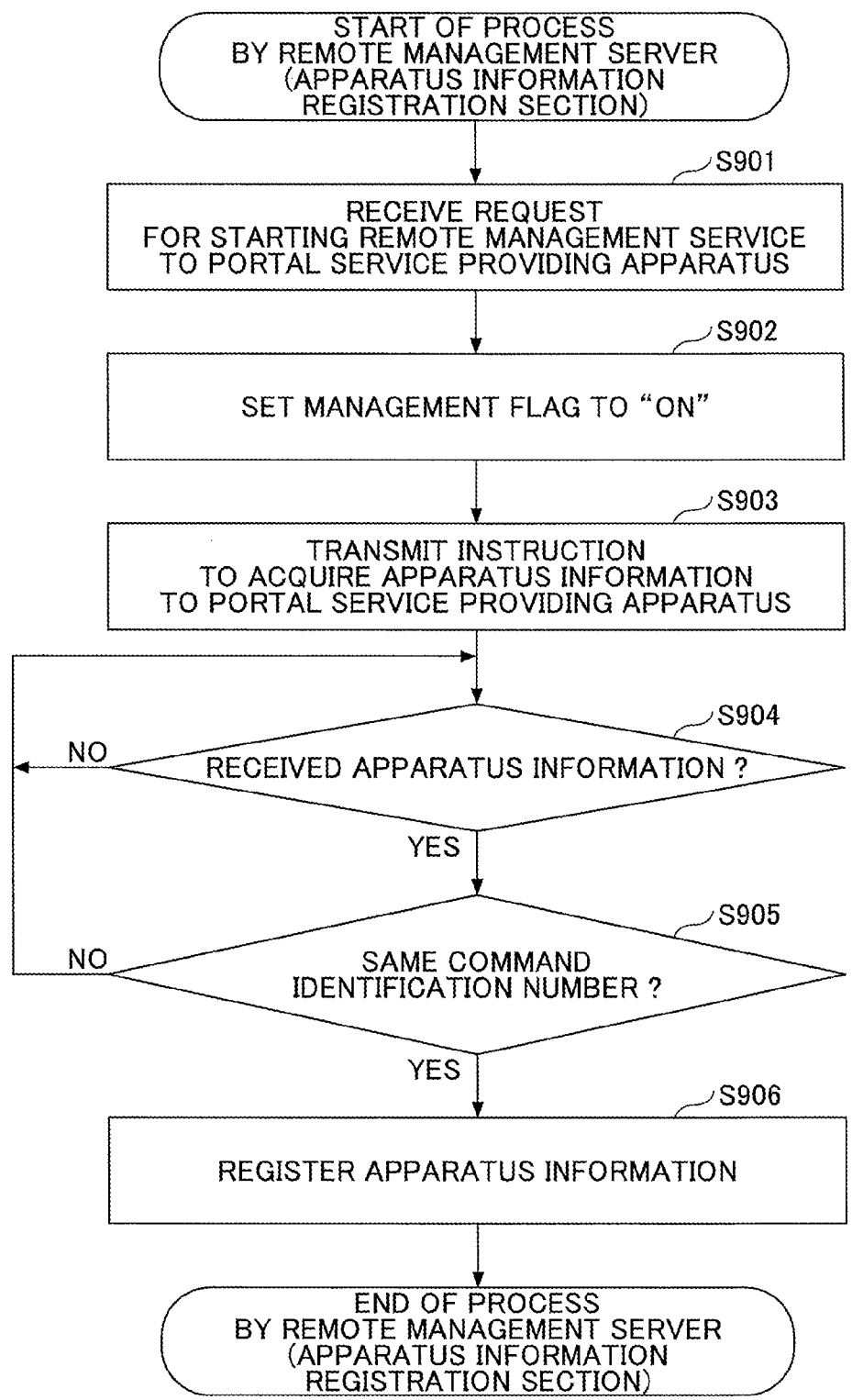
FIG. 9 is a flowchart of an example process performed by the remote management server 130 during the installation operation.

Process of the Remote Management Server 130 During the Installation Operation Next, a flow of the process by the remote management server 130 during the installation operation is described. FIG. 9 is a flowchart of a process performed by the apparatus information registration section 411*b* of the remote management server 130 during the installation operation.

In step 901, when the portal service providing apparatus 140 transmits the request for starting the remote management service including the service identification number 423, the remote management server 130 receives the request.

In step S902, based on the service identification number 423 included in the received request for starting the remote management service, the remote management server 130 sets the corresponding management flag 425 in the master data 412 to "ON".

In step S903, in order to acquire the apparatus information of the apparatus to be managed whose corresponding management flag 425 is set to "ON", the remote management server 130 transmits the instruction to acquire the apparatus information of the apparatus to be managed to the portal service providing apparatus 140. In this case, the remote management server 130 issues the command identification number to identify the instruction to acquire the apparatus information, and transmits the command identification number along with the instruction to acquire the apparatus information to the portal service providing apparatus 140.

After the transmission of the instruction to acquire the apparatus information, the remote management server 130 waits for the transmission of the apparatus information from the apparatus to be managed. Specifically, in step S904, the remote management server 130 determines whether the apparatus information is transmitted from the apparatus. When determining that the apparatus information is transmitted (YES in step S904), the remote management server 130 reads the command identification number included in the apparatus information. Then, the remote management server 130 further determines whether the read command identification number corresponds to the command identification number that is transmitted along with the instruction to acquire the apparatus information in step S903 (step S905). When the command identification numbers are the same (YES in step S905), the remote management server 130 determines that that the apparatus information to be acquired is received, and the process goes to step S906. On the other hand, when the command identification numbers are not the same (NO in step S905), the remote management server 130 further waits until the reception of the apparatus information so that the command identification numbers are not the same. Namely, the process goes back to step S904.

In step S906, the remote management server 130 stores the apparatus information received in step S904 into the master data 412 as the apparatus information of the apparatus to be managed corresponding to the command identification number corresponding to the received apparatus information.

Outline

As is apparent from the above description, the remote management system according to this embodiment has the following features.

1) It becomes possible for the portal service providing apparatus, which permits various apparatuses owned by a user to access the Cloud service providing apparatuses providing the respective Cloud services, to request for starting the remote management service for the apparatus to be managed.

2) The request for starting the remote management service is executed by inputting the service identification number, which is the identification information indicating the contract of the remote management service, by the user.

3) The acquisition of the apparatus information desired to be registered into the master data upon the start of the remote management service is started when the service identification number is received as a trigger. Specifically, the remote management server transmits the instruction to acquire the apparatus information to the portal service providing apparatus, so that, upon receiving the request for the use of the Cloud service, the portal service providing apparatus adds the acquisition request command to acquire the apparatus information to the respond command to respond to the request for the use of the Cloud service.

4) The apparatus to be managed, that receives the acquisition request command to acquire the apparatus information, acquires the apparatus information of the apparatus to be managed, and directly transmits the acquired apparatus information to the remote management server.

5) The remote management server, that receives the apparatus information, registers the apparatus information to start the remote management service.

By doing this, it becomes possible for the user to complete the installation operation of the apparatus simply by physically connecting the apparatus to the network, accessing the portal service providing apparatus, and inputting the service identification number of the apparatus for which the user requests to start the remote management service.

Namely, it becomes possible to remove the process of sending an expert operator to the installation site so that the expert operator operates to access the remote management server via the apparatus to which the remote management service is to be provided and register the apparatus information into the remote management server.

As a result, it becomes possible to simplify the installation operation in the remote management system.

Second Embodiment

In the first embodiment, a case is described where the request for starting the remote management service is executed by accessing the portal service providing apparatus 140 and inputting the service identification number by the user. However, the present invention is not limited to this configuration. For example, the remote management service may be started without inputting the service identification number via the portal service providing apparatus 140 by the user. Details of the second embodiment are described with reference to FIGS. 10 through 13.

Figure 10:
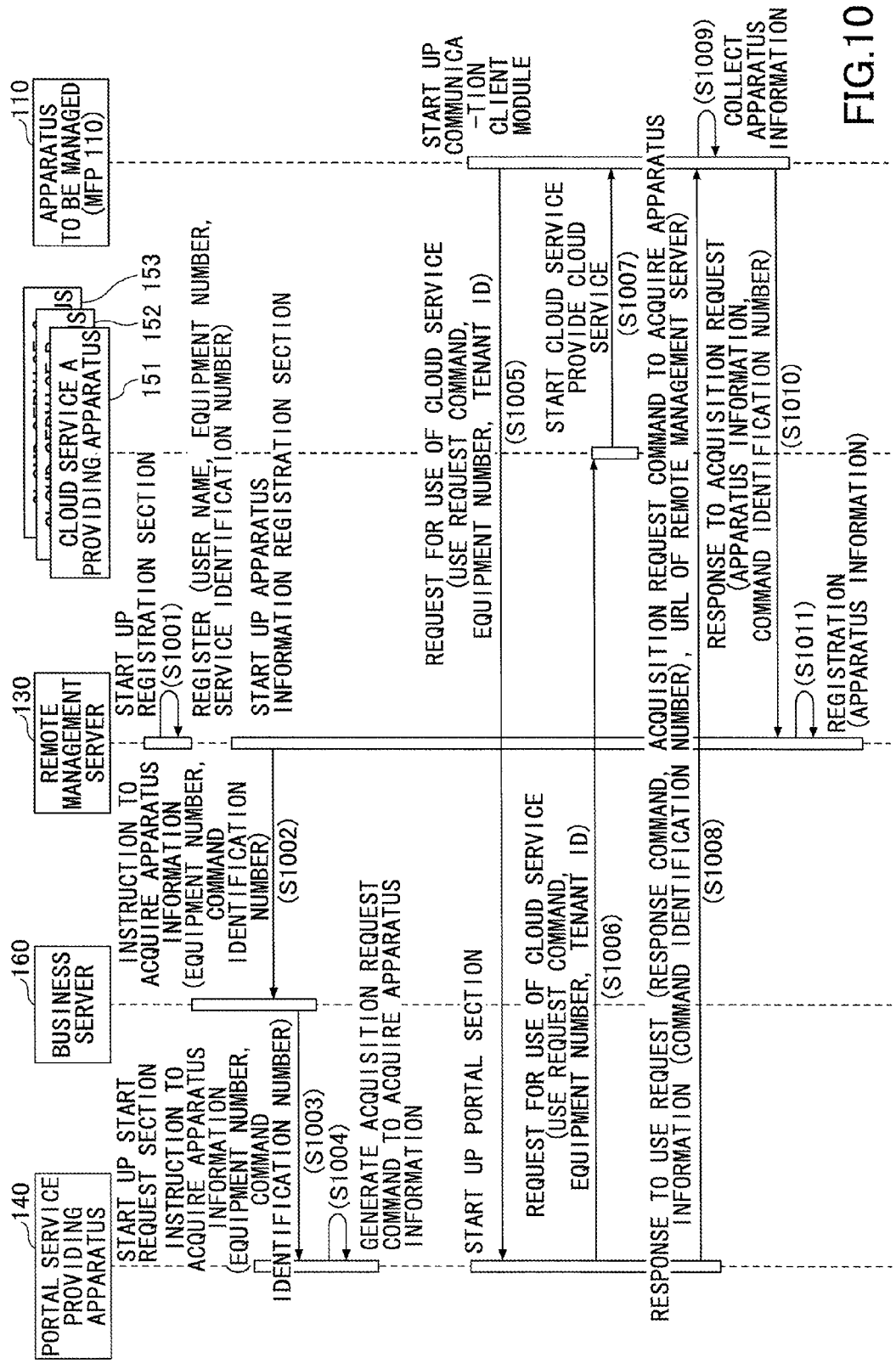
FIG. 10 is another sequence diagram of another example operation during the installation operation.

Description of an Operational Sequence of the Sections During the Installation Operation First, an operational sequence of the sections during the installation operation is described. FIG. 10 illustrates an example operational sequence of the sections (i.e., the portal service providing apparatus 140, the business server 160, the remote management server 130, the Cloud service providing apparatuses 151 through 153, and the apparatus to be managed (MFP 110)) during the installation operation.

If there is a contract to receive the remote management service when a user purchases or rents the apparatus to be managed (MFP 110), the manager of the remote management server 130 starts up the registration section 411a, and registers the user name 421, the equipment number 422, and the service identification number 423 into the master data 412 (step S1001).

After the registration of the user name 421, the equipment number 422, and the service identification number 423 (here "1234567890") into the master data 412, the apparatus information registration section 411b is started up. In step S1002, the remote management server 130 transmits the instruction to acquire the apparatus information of the apparatus to be managed (MFP 110) whose registration is completed to the business server 160. Here, it is assumed that the instruction to acquire the apparatus information of the apparatus to be managed (MFP 110), which is transmitted from the remote management server 130 to the business server 160, includes the equipment number 422 of the apparatus to be managed (MFP 110) and the command identification number to identify the instruction to acquire the apparatus information.

The business server 160, which receives the instruction to acquire the apparatus information from the remote management server 130, transmits the instruction to acquire the apparatus information to the portal service providing apparatus 140. Further, when transmitting the instruction to acquire the apparatus information, the business server 160 determines whether the equipment number 422 of the apparatus to be managed (MFP 110) is registered in the management data 612. This is because if the equipment number 422 of the apparatus to be managed (MFP 110) is not registered in the management data 612 of the business server 160, it is not possible to execute the request for the use of the Cloud service and also it is not possible to acquire the apparatus information of the apparatus to be managed (MFP 110).

The portal service providing apparatus 140, which receives the instruction to acquire the apparatus information from the business server 160, starts up the start request section 511 (step S1003), and generates the acquisition request command to acquire the apparatus information including the command identification number (step S1004). Further, the portal service providing apparatus 140 prepares for adding the generated acquisition request command to acquire the apparatus information to a response command which is the response to the reception of the Cloud service use request command to request for the use of the Cloud service received from the apparatus to be managed (MFP 110), and waits for the reception.

After that, the user starts up the apparatus to be managed (MFP 110) and inputs the request for the use of the Cloud service.

Specifically, the user starts up the communication client module 202 of the apparatus to be managed (MFP 110) and accesses the portal service providing apparatus 140, so that the user interface 520 is displayed on the apparatus to be managed (MFP 110).

Further, on the user interface 520 displayed on the apparatus to be managed (MFP 110), the user presses the apparatus button 521 to select the apparatus to receive the Cloud service. Further, by pressing the tenant ID button 522, the identifier (tenant ID) indicating the type of the desired Cloud service is input. By doing this, the portal section 512 of the portal service providing apparatus 140 is started up. Further, in step S1005, the portal service providing apparatus 140 receives the request for the use of the Cloud service, which includes the Cloud service use request command to request for the use of the Cloud service, the equipment number, and the tenant ID, transmitted from the apparatus to be managed (MFP 110).

Upon the receipt of the request for the use of the Cloud service, the portal service providing apparatus 140 identifies the Cloud service, which is requested to be used, based on the tenant ID included in the request for the use of the Cloud service (step S1006). Further, the portal service providing apparatus 140 transmits the request for the use of the Cloud service to the Cloud service providing apparatus (in this embodiment, any of the Cloud service A providing apparatuses 151 through 153) that can provide the identified Cloud service.

The one (any) of the Cloud service A providing apparatuses 151 through 153 that receives the request for the use of the Cloud service provides the Cloud service to the apparatus to be managed (MFP 110) corresponding to the apparatus included in the request for the use of the Cloud service (step S1007).

Further, after the completion of the transmission of the request for the use of the Cloud service to the one of the Cloud service A providing apparatuses 151 through 153, the portal service providing apparatus 140 responds to the received request for the use of the Cloud service (step S1008). Specifically, the portal service providing apparatus 140 transmits a response command in response to the received request for the use of the Cloud service to the apparatus to be managed (MFP 110).

In this case, the portal service providing apparatus 140 determines whether the apparatus that transmits the request for the use of the Cloud service in step S1005 is the apparatus to be managed (MFP 110) to which the acquisition request command to acquire the apparatus information generated in step S1004 is to be transmitted. When determining that the apparatus that transmits the request for the use of the Cloud service is the apparatus to be managed (MFP 110) to which the acquisition request command to acquire the apparatus information is to be transmitted, the portal service providing apparatus 140 adds the acquisition request command to acquire the apparatus information to the respond command. Further, the portal service providing apparatus 140 adds the URL of the remote management server 130 to the respond command.

By doing this, it becomes possible to transmit the acquisition request command to acquire the apparatus information and the URL of the remote management server 130 to the apparatus to be managed (MFP 110) whose apparatus information is to be acquired by the remote management server 130. Further, as described above, the acquisition request command to acquire the apparatus information includes the command identification number. Therefore, when the apparatus information received by the remote management server 130 includes the command identification number, the remote management server 130 can determine that the received apparatus information is the apparatus information to be acquired.

In step S1009, upon receiving the response to the request for the use of the Cloud service, the apparatus to be managed (MFP 110) collects the apparatus information of the apparatus to be managed based on the acquisition request command to acquire the apparatus information appended to the respond command.

Further, in step S1010, the apparatus to be managed (MFP 110) transmits the collected apparatus information to the URL of the remote management server 130 as the response to the acquisition request command to acquire the apparatus information. In this case, the apparatus to be managed (MFP 110) transmits the command identification number, included in the acquisition request command to acquire the apparatus information, in association with the apparatus information.

The remote management server 130, which receives the apparatus information in association with the command identification number, determines whether the received command identification number corresponds to the command identification numbers included in the instruction to acquire the apparatus information when the instruction to acquire the apparatus information is transmitted to the portal service providing apparatus 140. When determining that the command identification numbers are different, the remote management server 130 determines that the received apparatus information is not the apparatus information to be acquired. On the other hand, when determining that the command identification numbers are the same, the remote management server 130 determines that the received apparatus information is the apparatus information to be acquired based on the instruction to acquire the apparatus information.

When determining that the received apparatus information is the apparatus information to be acquired, in step S1011, the remote management server 130 registers the received apparatus information into the master data 412. In this embodiment, the instruction to acquire the apparatus information is issued for the apparatus to be managed whose service identification number 423 is "1234567890". Therefore, the apparatus information received from the apparatus to be managed is associated and stored with the service identification number 423 into the master data 412 (see FIG. 4).

By doing this, the remote management service is started for the apparatus to be managed (MFP 110) having the above service identification number.

Figure 11:
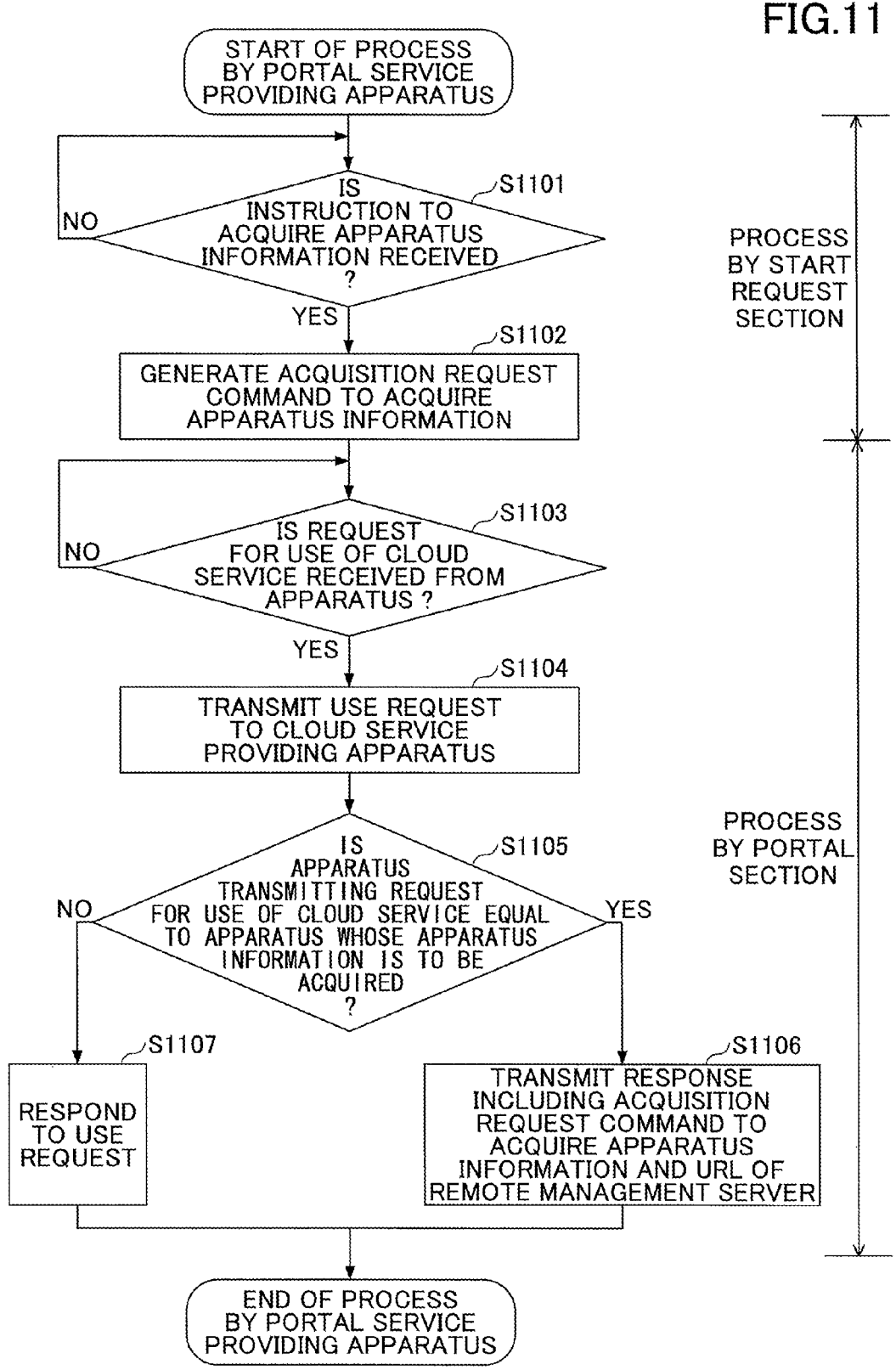
FIG. 11 is another flowchart of another example process performed by the portal service providing apparatus 140 during the installation operation.

Process by the Portal Service Providing Apparatus 140 During the Installation Operation Next, a flow of the process by the portal service providing apparatus 140 during the installation operation is described. FIG. 11 is a flowchart of a process performed by the portal service providing apparatus 140 during the installation operation.

In step S1101, the portal service providing apparatus 140 determines whether the start request section 511 receives the instruction to acquire the apparatus information from the business server 160. When determining that the instruction to acquire the apparatus information is not received from the business server 160 (NO in step S1101), the portal service providing apparatus 140 waits until the reception of the instruction to acquire the apparatus information. Here, it is assumed that the instruction to acquire the apparatus information to be received in this step includes the equipment number of the apparatus to be managed whose apparatus information is to be acquired and the command identification number issued by the remote management server 130.

On the other hand, When determining that the instruction to acquire the apparatus information is received from the business server 160 (YES in step S1101), the process goes to step S1102. In step S1102, the start request section 511 generates the acquisition request command to acquire the apparatus information that is to be included in the response in response to the request for the use of the Cloud service when the request for the use of the Cloud service is received.

Here, the instruction to acquire the apparatus information from the remote management server 130 includes the command identification number to identify the instruction. Therefore, in step S1102, the start request section 511 generates the acquisition request command to acquire the apparatus information including the command identification number.

In step S1103, the portal service providing apparatus 140 determines whether the portal section 512 receives the request for the use of the Cloud service from the apparatus. In step S1103, when determining that the request for the use of the Cloud service is not received (NO in step S1103), the portal service providing apparatus 140 waits until the request for the use of the Cloud service is received.

On the other hand, in step S1103, when determining that the request for the use of the Cloud service is received (YES in step S1103), the process goes to step S1104. In step S1104, the portal section 512 transmits the request for the use of the Cloud service to the Cloud service providing apparatus that provides the Cloud service corresponding to the tenant ID.

Further, in step S1105, the portal section 512 determines whether the apparatus that transmits the request for the use of the Cloud service is the apparatus to be managed whose apparatus information is to be acquired.

Specifically, to that end, the portal section 512 determines whether the equipment number included in the request for the use of the Cloud service correspond to the equipment number of the apparatus to be managed to which the acquisition request command to acquire the apparatus information generated in step S1102 is to be transmitted. When it is determined that the equipment numbers are the same (YES in step S1105), the process goes to step S1106.

In step S1106, as the response to the request for the use of the Cloud service, the response command in association with the acquisition request command to acquire the apparatus information generated in step S1102 and the URL of the remote management server 130 is transmitted to the apparatus to be managed which is the request source.

On the other hand, when it is determined that the equipment numbers are different from each other (NO in step S1105), the process goes to step S1107. In step S1107, as the response to the request for the use of the Cloud service, the response command is transmitted to the apparatus to be managed which is the request source.

Figure 12:
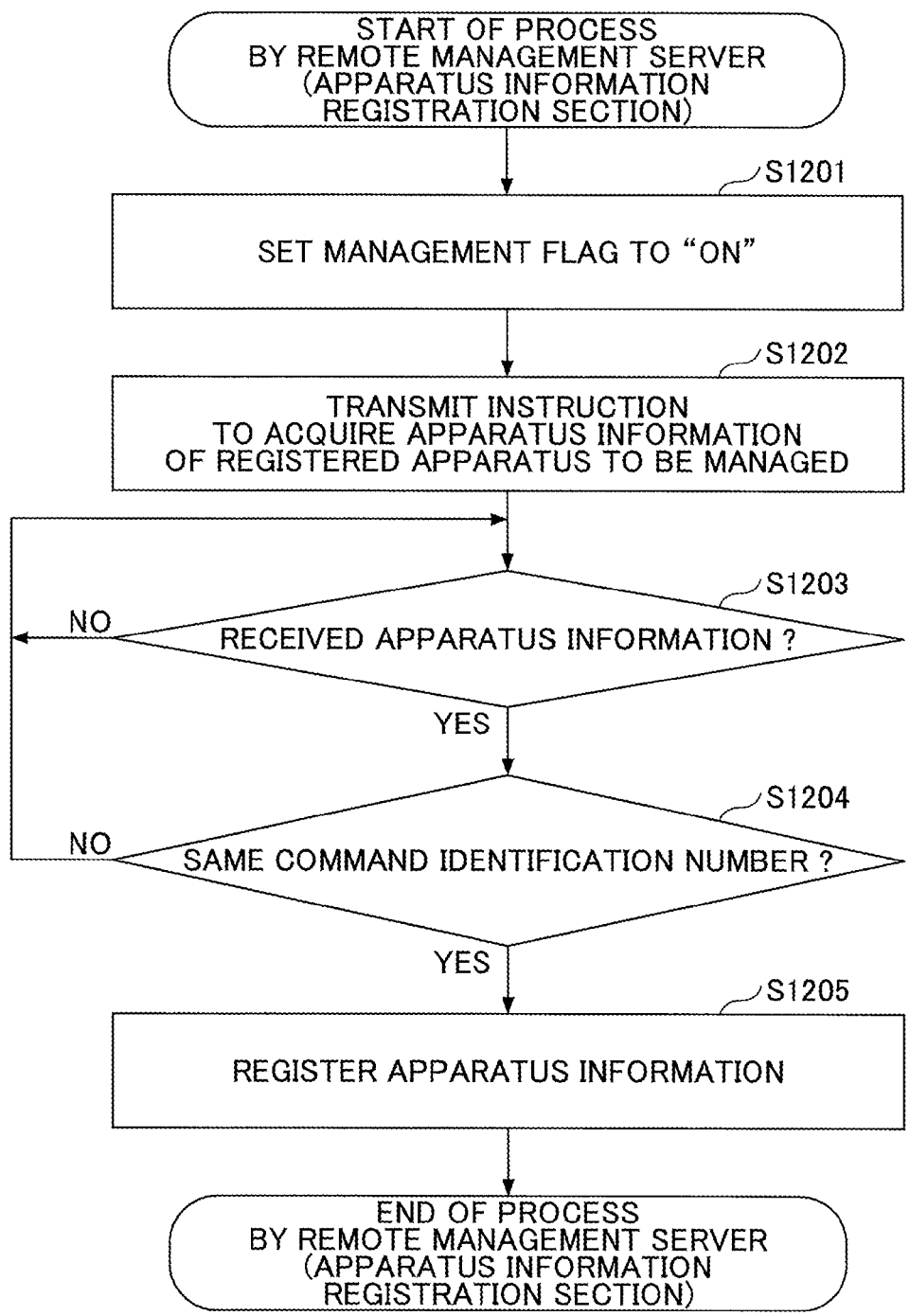
FIG. 12 is another flowchart of another example process performed by the remote management server 130 during the installation operation.

Process by the Remote Management Server 130 During the Installation Operation Next, a flow of the process by the remote management server 130 during the installation operation is described. FIG. 12 is a flowchart of a process performed by the apparatus information registration section 411b of the remote management server 130 during the installation operation is described.

If there is a contract to receive the remote management service when a user purchases or rents an apparatus, the manager of the remote management server 130 registers the user name 421, the equipment number 422, and the service identification number 423 into the master data 412. When the service identification number 423 is registered into the master data 412, the apparatus information registration section 411*b* started up. Further, in step S1201, the remote management server 130 sets the management flag 425, which corresponds to the service identification number 423, to "ON", and issues the command identification number.

In step S1202, the remote management server 130 transmits the instruction to acquire the apparatus information of the registered apparatus to be managed (MFP 110) to the business server 160. Here, it is assumed that the instruction to acquire the apparatus information transmitted to the business server 160 includes the command identification number.

After the transmission of the instruction to acquire the apparatus information to the business server 160, the remote management server 130 waits until the transmission of the apparatus information from the apparatus to be managed. Specifically, in step S1203, the remote management server 130 determines whether the apparatus information is transmitted (received) from the apparatus. When determining that the apparatus information is transmitted (received) from the apparatus (YES in step S1203), the remote management server 130 reads the command identification information included in the apparatus information. Then, the remote management server 130 further determines whether the read command identification number corresponds to the command identification number transmitted along with the instruction to acquire the apparatus information in step S1202 (step S1204). When determining that the command identification numbers are the same (YES in step S1204), the remote management server 130 determines that the apparatus information to be acquired is received, and the process goes to step S1205. On the other hand, when determining that the command identification numbers are different from each other (NO in step S1204), the process goes back to step S1203.

In step S1205, the remote management server 130 registers the apparatus information received in step S1203 into the master data 422 as the apparatus information of the apparatus to be managed corresponding to the command identification number corresponding to the received apparatus information.

Outline

As apparent from the above description, the remote management system according to this embodiment has the following features.

1) The remote management server transmits the instruction to acquire the apparatus information of the apparatus to be managed to the business server when the service identification number indicating the contract of the remote management service is registered in the remote management server as a trigger.

2) Upon receiving the instruction to acquire the apparatus information from the remote management server via the business server, the portal service providing apparatus generates the acquisition request command to acquire the apparatus information.

3) Upon receiving the request for the use of the Cloud service from the apparatus to be managed, the portal service providing apparatus adds the acquisition request command to acquire the apparatus information to the response command in response to the request for the use of the Cloud service.

4) The apparatus to be managed, that receives the acquisition request command to acquire the apparatus information, acquires the apparatus information of the apparatus to be managed, and directly transmits the acquired apparatus information to the remote management server.

5) The remote management server, that receives the apparatus information, registers the apparatus information to start the remote management service.

By doing this, it becomes possible for the user to complete the installation operation of the apparatus simply by physically connecting the apparatus to the network.

Namely, it becomes possible to remove the process of sending an expert operator to the installation site so that the expert operator operates to access the remote management server via the apparatus to which the remote management service is to be provided and register the apparatus information into the remote management server.

As a result, it becomes possible to simplify the installation operation in the remote management system.

Third Embodiment

In the above two embodiments, a case is described where the portal service providing apparatus 140 receives the instruction to acquire the apparatus information transmitted from the remote management server 130 via the business server 160. However, the present invention is not limited to this configuration. For example, the portal service providing apparatus 140 may directly receive the instruction to acquire the apparatus information transmitted from the remote management server 130 without the intervention of the business server 160.

Figure 13:
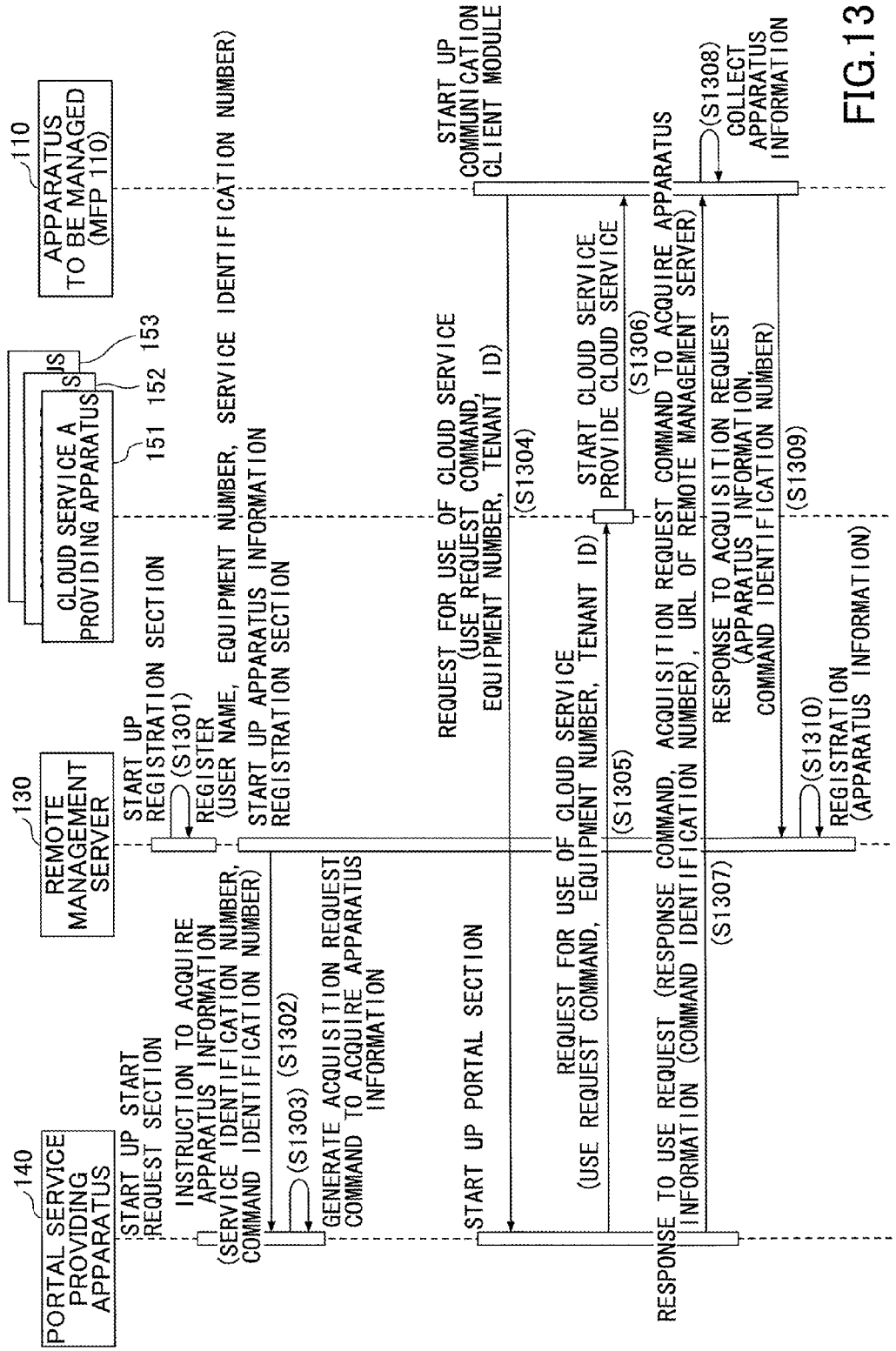
FIG. 13 is another sequence diagram of another example operation during the installation operation.

FIG. 13 illustrates an example operational sequence of the sections. As illustrated in FIG. 13, the portal service providing apparatus 140 directly receives the instruction to acquire the apparatus information transmitted from the remote management server 130.

The contents of the sequence diagram in FIG. 13 are the same as those in FIG. 10 except that the portal service providing apparatus 140 directly receives the instruction to acquire the apparatus information transmitted from the remote management server 130 without the intervention of the business server 160. Therefore, the descriptions of FIG. 13 are herein omitted.

Fourth Embodiment

In the first embodiment, a case is described where the remote management server 130 transmits the instruction to acquire the apparatus information when the request for starting the remote management service is transmitted via the user interface 520 which is provided by the portal service providing apparatus 140 as a trigger.

Further, in the second and the third embodiments, a case is described where the remote management server 130 transmits the instruction to acquire the apparatus information when the service identification number 423 is registered into the master data 412.

However, the present invention is not limited to those configurations. For example, the remote management server 130 may transmit the instruction to acquire the apparatus information when the remote management server 130 recognizes (determines) that the first request for the use of the Cloud service is transmitted to the portal service providing apparatus 140 as a trigger. In the following, details of this embodiment are described.

Figure 14:
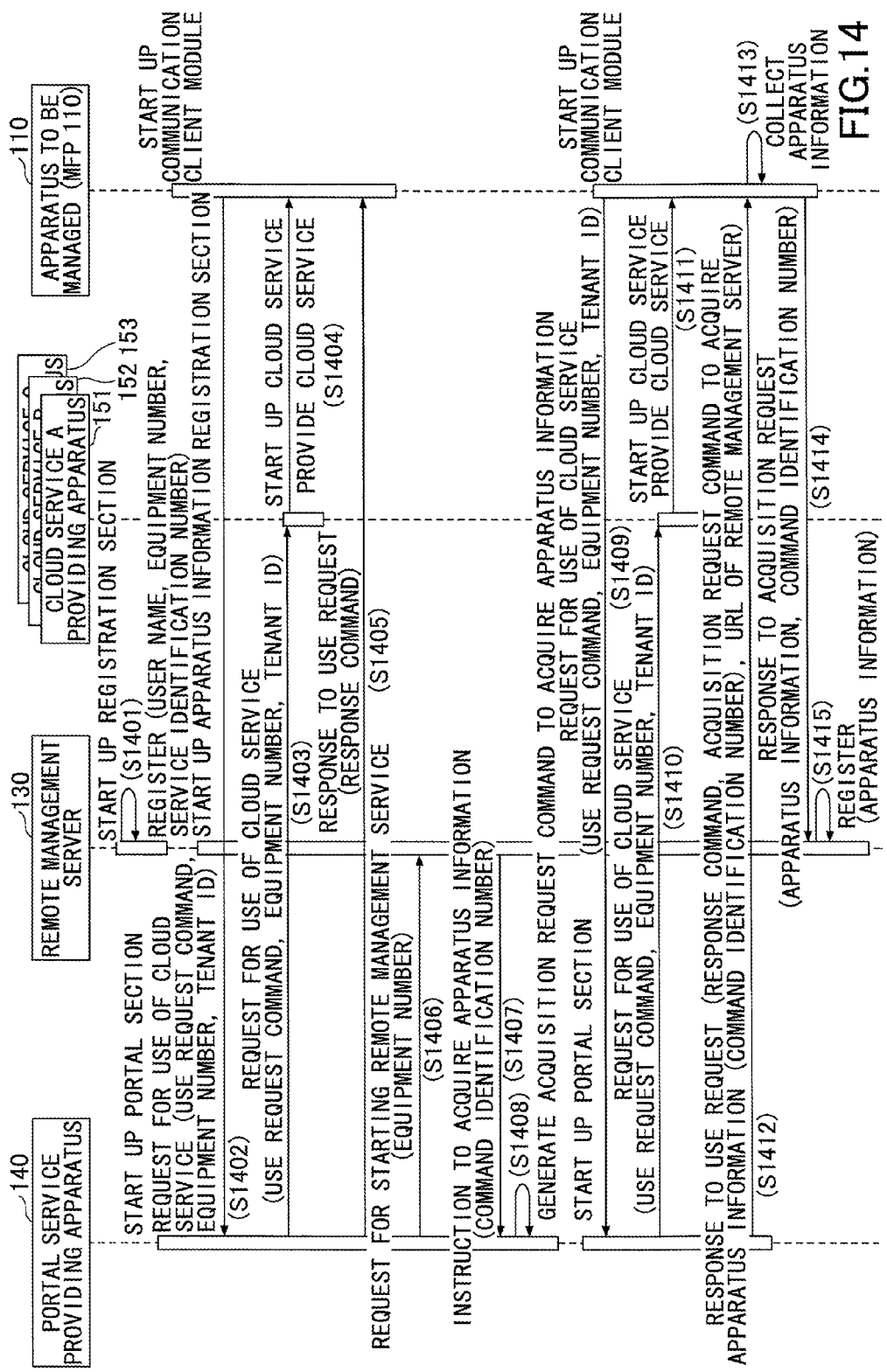
FIG. 14 is another flowchart of another example process performed by the portal service providing apparatus 140 during the installation operation.

Description of an Operational Sequence of the Sections During the Installation Operation First, an operational sequence of the sections during the installation operation is described. FIG. 14 illustrates an example operational sequence of the sections (i.e., the portal service providing apparatus 140, the remote management server 130, the Cloud service providing apparatuses 151 through 153, and the apparatus to be managed (MFP 110)) during the installation operation.

If there is a contract to receive the remote management service when a user purchases or rents the apparatus to be managed (MFP 110), the manager of the remote management server 130 starts up the registration section 411*a*, and registers the user name 421, the equipment number 422, and the service identification number 423 (here "1234567890") into the master data 412 (step S1401).

After the registration of the user name 421, the equipment number 422, and the service identification number 423 into the master data 412, the apparatus information registration section 411*b* is started up.

After that, the user completes the physical connection the apparatus to be managed (MFP 110) to the network 120, starts up the apparatus to be managed (MFP 110), and inputs the request for the use of the Cloud service.

Specifically, the user starts up the communication client module 202 of the apparatus to be managed (MFP 110) and accesses the portal service providing apparatus 140, so that the user interface 520 is displayed on the apparatus to be managed (MFP 110).

Further, on the user interface 520 displayed on the apparatus to be managed (MFP 110), the user presses the apparatus button 521 to select the apparatus to receive the Cloud service. Further, by pressing the tenant ID button 522, the identifier (tenant ID) indicating the type of the desired Cloud service is input. By doing this, the portal section 512 of the portal service providing apparatus 140 is started up. Further, in step S1402, the portal service providing apparatus 140 receives the request for the use of the Cloud service, which includes the Cloud service use request command to request for the use of the Cloud service, the equipment number, and the tenant ID, transmitted from the apparatus to be managed (MFP 110).

Upon the receipt of the request for the use of the Cloud service, the portal service providing apparatus 140 identifies the Cloud service, which is requested to be used, based on the tenant ID included in the request for the use of the Cloud service (step S1403). Further, the portal service providing apparatus 140 transmits the request for the use of the Cloud service to the Cloud service providing apparatus (in this embodiment, any of the Cloud service A providing apparatuses 151 through 153) that can provide the identified Cloud service.

The one of the Cloud service A providing apparatuses 151 through 153 that receives the request for the use of the Cloud service provides the Cloud service to the apparatus to be managed (MFP 110) corresponding to the equipment number included in the request for the use of the Cloud service (step S1404).

Further, the portal service providing apparatus 140 determines whether the request for the use of the Cloud service received in step S1402 is the first request for the use of the Cloud service transmitted from the apparatus to be managed (MFP 110). When determining that the received request is the first request for the use of the Cloud service, the portal service providing apparatus 140 transmits the response command as the respond to the request for the use of the Cloud service to the apparatus to be managed (MFP 110) (step S1405).

Further, the portal service providing apparatus 140 transmits the request for starting the remote management service to the remote management server 130 (step S1406). Here, it is assumed that the request for starting the remote management service includes the equipment number included in the first request for the user of the Cloud service.

The remote management server 130, which receives the request for starting the remote management service from the portal service providing apparatus 140, determines whether the apparatus corresponding to the equipment number included in the request for starting the remote management service includes the service identification number 423 based on the master data 412. Namely, the remote management server 130 determines whether the apparatus is the apparatus to be managed which is to receive the remote management service based on a contract when the user purchases or rents the apparatus. Further, the remote management server 130 determines whether the management flag 425 of the apparatus is set as "ON" based on the master data 412.

When determining that the apparatus is the apparatus to be managed and the management flag 425 is not set as "ON", the remote management server 130 determines that the apparatus is the apparatus to be managed for which the remote management service is started. Then, the remote management server 130 transmits the instruction to acquire the apparatus information of the apparatus to be managed (MFP 110) to the portal service providing apparatus 140 (step S1407). Here, it is assumed that the instruction to acquire the apparatus information transmitted from the remote management server 130 includes the command identification information to identify the instruction.

In step S1408, the portal service providing apparatus 140, to which the instruction to acquire the apparatus information is transmitted, generates the acquisition request command to acquire the apparatus information, the command including the command identification number. Further, the portal service providing apparatus 140 adds the generated acquisition request command to acquire the apparatus information to the response command that is to be responded to in response to the second Cloud service use request command to request for the use of the Cloud service from the apparatus to be managed (MFP 110), and waits for the reception of the second Cloud service use request command.

After that, it is assumed that the user inputs the request for the use of the Cloud service again on the apparatus to be managed (MFP 110).

Specifically, the user starts up the communication client module of the apparatus to be managed (MFP 110) and accesses the portal service providing apparatus 140, so that the user interface 520 is displayed on the apparatus to be managed (MFP 110).

Further, on the user interface 520 displayed on the apparatus to be managed (MFP 110), the user presses the apparatus button 521 to select the apparatus to receive the Cloud service. Further, by pressing the tenant ID button 522, the identifier (tenant ID) indicating the type of the desired Cloud service is input. By doing this, the portal section 512 of the portal service providing apparatus 140 is started up. Further, in step S1409, the portal service providing apparatus 140 receives the request for the use of the Cloud service, which includes the Cloud service use request command to request for the use of the Cloud service, the equipment number, and the tenant ID, transmitted from the apparatus to be managed (MFP 110).

Upon the receipt of the request for the use of the Cloud service, the portal service providing apparatus 140 identifies the Cloud service, which is requested to be used, based on the tenant ID included in the request for the use of the Cloud service (step S1410). Further, the portal service providing apparatus 140 transmits the request for the use of the Cloud service to the Cloud service providing apparatus (in this embodiment, any of the Cloud service A providing apparatuses 151 through 153) that can provide the identified Cloud service.

The one of the Cloud service A providing apparatuses 151 through 153 that receives the request for the use of the Cloud service provides the Cloud service to the apparatus to be managed (MFP 110) corresponding to the equipment number included in the request for the use of the Cloud service (step S1411).

Further, after the completion of the transmission of the request for the use of the Cloud service to the one of the Cloud service A providing apparatuses 151 through 153, the portal service providing apparatus 140 responds to the received request for the use of the Cloud service (step S1412). Specifically, the portal service providing apparatus 140 transmits a response command in response to the received request for the use of the Cloud service to the apparatus to be managed (MFP 110).

In this case, the portal service providing apparatus 140 determines whether this request for the use of the Cloud service by the apparatus to be managed (MFP 110) is the second request for the use of the Cloud service by the apparatus to be managed (MFP 110). When determining that this request is the second request for the use of the Cloud service, the portal service providing apparatus 140 further determines whether the apparatus to be managed (MFP 110) is the apparatus to be managed (MFP 110) to which the acquisition request command to acquire the apparatus information generated in step S1408 is to be transmitted. When determining that the apparatus to be managed (MFP 110) is the apparatus to be managed (MFP 110) to which the acquisition request command to acquire the apparatus information is to be transmitted, the portal service providing apparatus 140 adds the acquisition request command to acquire the apparatus information to the response command. The portal service providing apparatus 140 further adds the URL of the remote management server 130 to the response command.

By doing this, it becomes possible to transmit the acquisition request command to acquire the apparatus information and the URL of the remote management server 130 to the apparatus to be managed (MFP 110) whose apparatus information is to be acquired by the remote management server 130. Further, as described above, the acquisition request command to acquire the apparatus information includes the command identification number. Therefore, when the apparatus information received by the remote management server 130 includes the command identification number, the remote management server 130 can determine that the received apparatus information is the apparatus information to be acquired.

In step S1413, upon receiving the response to the request for the use of the Cloud service, the apparatus to be managed (MFP 110) collects the apparatus information of the apparatus to be managed based on the acquisition request command to acquire the apparatus information appended to the respond command.

Further, in step S1414, the apparatus to be managed (MFP 110) transmits the collected apparatus information to the URL of the remote management server 130 as the response to the acquisition request command to acquire the apparatus information. In this case, the apparatus to be managed (MFP 110) transmits the command identification number, included in the acquisition request command to acquire the apparatus information, in association with the apparatus information.

The remote management server 130, which receives the apparatus information in association with the command identification number, determines whether the received command identification number corresponds to the command identification numbers included in the instruction to acquire the apparatus information when the instruction to acquire the apparatus information is transmitted to the portal service providing apparatus 140. When determining that the command identification numbers are different, the remote management server 130 determines that the received apparatus information is not the apparatus information to be acquired. On the other hand, when determining that the command identification numbers are the same, the remote management server 130 determines that the received apparatus information is the apparatus information to be acquired based on the instruction to acquire the apparatus information.

When determining that the received apparatus information is the apparatus information to be acquired, in step S1415, the remote management server 130 registers the received apparatus information into the master data 412. By doing this, the remote management service is started for the apparatus to be managed (MFP 110).

Figure 15:
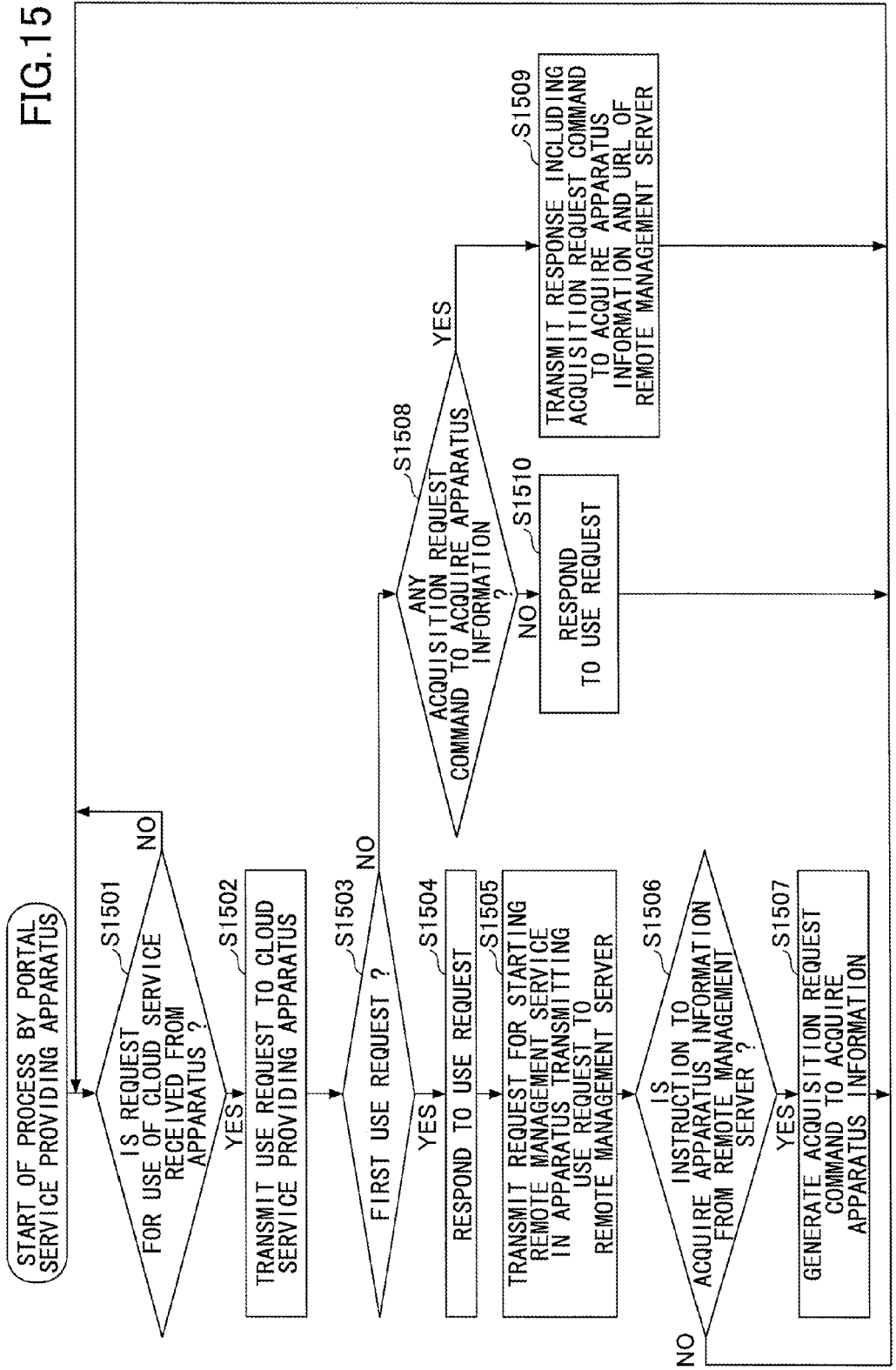
FIG. 15 is another flowchart of another example process performed by the portal service providing apparatus 140 during the installation operation.

Process by the Portal Service Providing Apparatus 140 During the Installation Operation Next, a flow of the process by the portal service providing apparatus 140 during the installation operation is described. FIG. 15 is a flowchart of a process performed by the portal section 512 of the portal service providing apparatus 140 during the installation operation.

In step S1501, the portal service providing apparatus 140 determines whether the Cloud service use request command to request for the use of the Cloud service is received from the apparatus. When determining that the Cloud service use request command to request for the use of the Cloud service is not received from the apparatus, the portal service providing apparatus 140 waits until the determination of the reception of the Cloud service use request command.

On the other hand, when determining that the Cloud service use request command to request for the use of the Cloud service is received from the apparatus in step S1501 (YES in step S1501), the process goes to step S1502. In step S1502, the portal service providing apparatus 140 transmits the request for the use of the Cloud service to the Cloud service providing apparatus that provides the Cloud service corresponding to the tenant ID included in the request for the use of the Cloud service.

In step S1503, the portal service providing apparatus 140 determines whether the reception of the request for the user of the Cloud service from the apparatus is the first request (i.e., in the first time).

In step S1503, when determining that the request is the first request, the process goes to step S1504. In step S1504, the portal service providing apparatus 140 transmits the response command as the response to the request for the use of the Cloud service to the apparatus of the request source.

In step S1505, the portal service providing apparatus 140 transmits the request for starting the remote management service for the apparatus that transmits the request for the use of the Cloud service to the remote management server 130. Here, the portal service providing apparatus 140 identifies the apparatus to be managed for which the remote management service is started by including the equipment number, which is included in the request for the use of the Cloud service, into the request for starting the remote management service.

In step S1506, as the response to the request for starting the remote management service, the portal service providing apparatus 140 determines whether the instruction to acquire the apparatus information is received from the remote management server 130. When determining that the instruction to acquire the apparatus information is not received in step S1506 (NO in step S1506), the process goes back to step S1501.

On the other hand, when determining that the instruction to acquire the apparatus information is received from the remote management server 130 in step S1506 (YES in step S1506), the portal service providing apparatus 140 determines that the apparatus is the apparatus to be managed for which the remote management service is to be started and the process goes to step S1507. In step S1507, the portal service providing apparatus 140 generates the acquisition request command to acquire the apparatus information that is to be included into the response in response to the second request for the use of the Cloud service when the second request for the use of the Cloud service is received.

Here, the instruction to acquire the apparatus information from the remote management server 130 includes the command identification information to identify the instruction. Therefore, in step S1507, the portal service providing apparatus 140 generates the acquisition request command to acquire the apparatus information including the command identification number. After that, the process goes back to step S1501 and the portal service providing apparatus 140 waits until the next request for the use of the Cloud is transmitted from the apparatus to be managed.

When the next request for the use of the Cloud service is transmitted, the process goes to step S1502 again. In step S1502, the portal service providing apparatus 140 transmits the request for the use of the Cloud service to the Cloud service providing apparatus that provides the Cloud service corresponding to the tenant ID included in the request for the use of the Cloud service included in the request for the use of the Cloud service.

Further, in step S1503, the portal service providing apparatus 140 determines whether the reception of the request for the use of the Cloud service is the first request.

However, the reception of the request for the use of the Cloud service from the apparatus to be managed is the second request (i.e., in the second time). The process goes to step S1508. In step S1508, the portal service providing apparatus 140 determines whether there exists the acquisition request command to acquire the apparatus information to be transmitted to the apparatus to be managed.

Specifically, to that end, the portal service providing apparatus 140 determines whether the equipment number included in the request for the use of the Cloud service corresponds to the equipment number of the apparatus to be managed to which the acquisition request command to acquire the apparatus information is to be transmitted. When determining that the equipment numbers are the same, the process goes to step S1509. In step S1509, as the response to the request for the use of the Cloud service, the portal service providing apparatus 140 transmits the response command along with the acquisition request command to acquire the apparatus information generated in step S1507 and the URL of the remote management server 130 in association with the response command to the apparatus to be managed of the request source.

On the other hand, when determining that there exists no acquisition request command to acquire the apparatus information to be transmitted to the apparatus to be managed, the process goes to step S1510, so that, as the response to the request for the use of the Cloud service, the portal service providing apparatus 140 transmits the response command to the request source.

Figure 16:
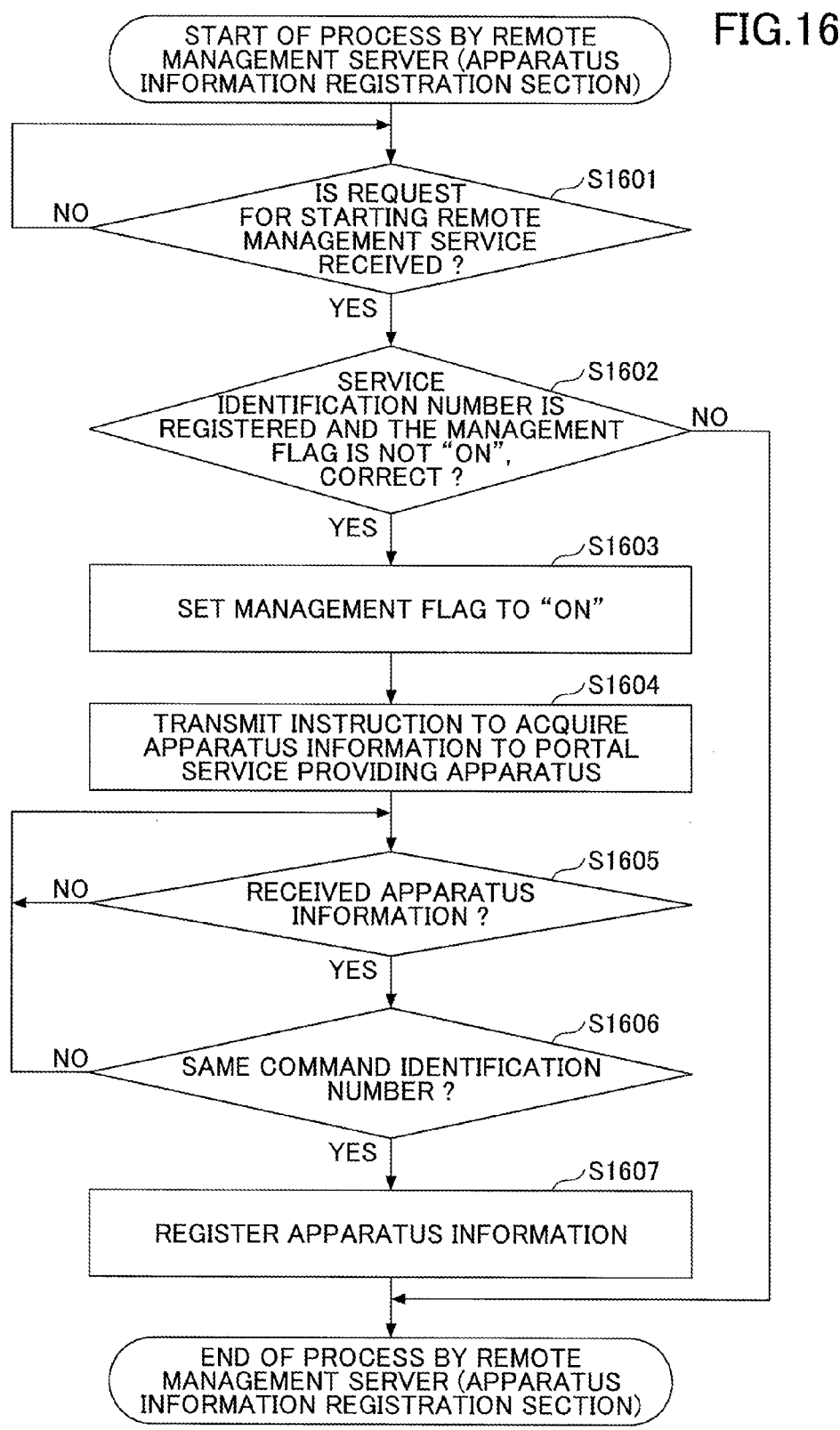
FIG. 16 is another flowchart of another example process performed by the remote management server 130 during the installation operation.

Process by the Remote Management Server 130 During the Installation Operation Next, a flow of the process by the remote management server 130 during the installation operation is described. FIG. 16 is a flowchart of a process performed by the apparatus information registration section 411*b* of the remote management server 130 during the installation operation is described.

In step S1601, the remote management server 130 determines whether the request for starting the remote management service is transmitted from the portal service providing apparatus 140. When determining that the request for starting the remote management service is not transmitted, the remote management server 130 waits until the transmission of the request for starting the remote management service.

On the other hand, when determining that the request for starting the remote management service is transmitted, the process goes to step S1602. In step S1602, the remote management server 130 determines whether the equipment number included in the request for starting the remote management service is registered in the master data 412 and the service identification number 423 corresponding to the equipment number is also registered.

Namely, if it is determined that the apparatus, which is the target for which the remote management service is started, is not the apparatus to be managed which is to receive the remote management service on a contract basis, the process is terminated.

Further, in step S1602, the remote management server 130 determines whether the management flag 425 corresponding to the equipment number 422 is set to "ON". Namely, if the remote management service is already started for the apparatus to be managed, the process is terminated.

In step S1602, when determining that the apparatus, which is the target for which the remote management service is started, is the apparatus to be managed and the management flag 425 is not set to "ON", the process goes to step S1603.

In step S1603, the remote management server 130 sets the corresponding management flag 425 in the master data 412 to "ON" based on the equipment number included in the received request for starting the remote management service.

In step S1604, in order to acquire the apparatus information of the apparatus to be managed whose management flag 425 is set to "ON", the remote management server 130 transmits the instruction to acquire the apparatus information of the apparatus to be managed to the portal service providing apparatus 140. In this case, the remote management server 130 issues the command identification number to identify the instruction to acquire the apparatus information, and transmits the command identification number along with the instruction to acquire the apparatus information to the portal service providing apparatus 140.

After the transmission of the instruction to acquire the apparatus information, the remote management server 130 waits until the transmission of the apparatus information from the apparatus to be managed. Specifically, in step S1605, the remote management server 130 determines whether the apparatus information is transmitted from the apparatus. When determining that the apparatus information is transmitted, the remote management server 130 reads the command identification number included in the apparatus information. Then, the remote management server 130 determines whether the read command identification number corresponds to the command identification number that is transmitted along with the instruction to acquire the apparatus information in step S1604. When determining that the command identification numbers are the same, the remote management server 130 determines that the apparatus information to be acquired is received and the process goes to step S1607. On the other hand, when determining that the command identification numbers are different from each other, the process goes back to step 1605 so that the remote management server 130 waits until the reception of apparatus information having the same command identification number as the read command identification number.

In step S1607, the remote management server 130 registers the apparatus information received in step S1605 into the master data 412 as the apparatus information of the apparatus to be managed corresponding to the command identification information corresponding to the apparatus information.

Outline

As apparent from the above description, the remote management system according to this embodiment has the following features.

1) The request for starting the remote management service is transmitted to the remote management server when the portal service providing apparatus receives the first request for the use of the Cloud service (i.e., for the first time).

2) The request for starting the remote management service is transmitted in a manner such that the request includes the equipment number of the apparatus of the transmission source that transmits the request for the use of the Cloud service.

3) The acquisition of the apparatus information desired to be registered into the master data upon the start of the remote management service is started when the request for starting the remote management service is received as a trigger. Specifically, the remote management server transmits the instruction to acquire the apparatus information to the portal service providing apparatus, so that, upon receiving the request for the use of the Cloud service, the portal service providing apparatus adds the acquisition request command to acquire the apparatus information to the respond command to respond to the request for the use of the Cloud service.

4) The apparatus to be managed, that receives the acquisition request command to acquire the apparatus information, acquires the apparatus information of the apparatus to be managed, and directly transmits the acquired apparatus information to the remote management server.

5) The remote management server, that receives the apparatus information, registers the apparatus information to start the remote management service.

By doing this, it becomes possible for the user to complete the installation operation of the apparatus simply by physically connecting the apparatus to the network, accessing the portal service providing apparatus, and transmitting the request for the use of the Cloud service.

Namely, it becomes possible to remove the process of sending an expert operator to the installation site so that the expert operator operates to access the remote management server via the apparatus to which the remote management service is to be provided and register the apparatus information into the remote management server.

As a result, it becomes possible to simplify the installation operation in the remote management system.

Fifth Embodiment

In the above first through fourth embodiment, a case is described where a user purchases or rents one apparatus to be managed (MFP 110) and starts the remote management service. However, the present invention is not limited to this configuration. For example, the present invention may also be applied to a case the user purchases or rents two or more apparatuses to be managed and starts the remote management service.

Further, according to the second through the fourth embodiments, even when a user purchases or rents two or more apparatuses to be managed, the manager of the remote management server 130 may collectively register (steps S1001, S1301, and S1401) the data into the master data 412. In addition, similar to the first embodiment, it is not necessary to input the same number of the service identification numbers as the number of the apparatuses to be managed (step S702) when the remote management service is started. Therefore, it is not necessary for the user to recognize each of the apparatuses to be managed.

Namely, in the second through the fourth embodiments, the workload of the user remains the same regardless of the number of the purchased or rent apparatuses to be managed. In other words, in the cases of the second through the fourth embodiments, the greater the number of the apparatuses to be managed are purchased or rent, the greater the effect of the simplification of the installation operation becomes.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

Reference is hereby made to Japanese Laid-open Patent Publication No. 2003-330823.

What is claimed is:

1. A remote management system comprising:
a service providing apparatus configured to enable access to a providing source that provides a service; and
a management apparatus configured to manage an apparatus connected to the management apparatus via a network,
wherein the service providing apparatus includes
a first memory having first computer readable instructions stored thereon; and
at least one first processor configured to execute the first computer readable instructions to,
receive an instruction, from the management apparatus, to acquire apparatus information of the connected apparatus corresponding to identification information to the service providing apparatus after the identification information is registered in the management apparatus,
generate an acquisition request command based on the received instruction indicating that the connected apparatus is to be managed by the management apparatus is registered in the management apparatus, and
when a use request for using the service is received from the connected apparatus, transmit a response to provide the service in combination with the acquisition request command in response to the use request, wherein the management apparatus includes
a second memory having second computer readable instructions stored thereon, and
at least one second processor configured to execute the second computer readable instructions to,
register the apparatus information of the connected apparatus, the apparatus information being transmitted from the connected apparatus to the management apparatus in response to the acquisition request command included in the response, in association with the identification information, and
manage the connected apparatus using the registered apparatus information.

2. The remote management system according to claim 1, wherein the at least one first processor is further configured to:
determine whether the apparatus transmitting the use request is the connected apparatus whose apparatus information is to be acquired by the instruction from the management apparatus, and
wherein, when determining that the apparatus transmitting the use request is the connected apparatus whose apparatus information is to be acquired by the instruction from the management apparatus, transmit a response including the acquisition request command in response to the use request.

3. The remote management system according to claim 2, wherein
the at least one first processor is further configured to
in response to the use request, transmit the response including a command identifier included in the instruction to acquire the apparatus information from the management apparatus; and
the at least one second processor is further configured to
when the transmitted apparatus information is in association with the command identifier, register the transmitted apparatus information in association with the identification information.

4. The remote management system according to claim 1, wherein the at least one first processor is further configured to:
when the use request is received from the connected apparatus, transmit the use request to the providing source that provides the service.

5. A remote management system comprising:
a service providing apparatus configured to enable access to a providing source that provides a service; and
a management apparatus configured to manage an apparatus connected to the management apparatus via a network,
wherein the service providing apparatus includes
a first memory having first computer readable instructions stored thereon, and
at least one first processor configured to execute the first computer readable instructions to,
transmit a start request to cause the management apparatus to start management of an apparatus that is identified by a desired operation on a user interface provided by the service,
receive an instruction, from the management apparatus, to acquire apparatus information of the identified apparatus from the identified apparatus after the identified apparatus is registered in the management apparatus,
generate an acquisition request command based on the received instruction indicating that the connected apparatus is to be managed by the management apparatus is registered in the management apparatus, and
when a use request for using the service is received from the identified apparatus, transmit a response to provide the service including the acquisition request command in response to the use request; and
wherein the management apparatus includes
a second memory having second computer readable instructions stored thereon, and
at least one second processor configured to execute the second computer readable instructions to,
register the apparatus information of the identified apparatus, the apparatus information being transmitted from the identified apparatus to the management apparatus in response to the acquisition request command included in the response, and
manage the identified apparatus using the registered apparatus information.

6. The remote management system according to claim 5, wherein the at least one first processor is further configured to,
determine whether the apparatus transmitting the use request is the identified apparatus, transmit the response including the acquisition request command in response to the use request.

7. The remote management system according to claim 6, wherein
the at least one first processor is further configured to
transmit the response including a command identifier included in the instruction to acquire apparatus information from the management apparatus; and
the at least one second processor is further configured to
register the transmitted apparatus information when the transmitted apparatus information is in association with the command identifier.

8. The remote management system according to claim 5, wherein the at least one first processor is further configured to:
when identification information indicating that the identified apparatus is to be managed by the management apparatus is input via the user interface, transmit the start request including the identification information to the management apparatus; and
when the instruction to acquire the apparatus information of the identified apparatus based on the identified information included in the start request is received, generate the acquisition request command to acquire the apparatus information of the identified apparatus from the identified apparatus.

9. The remote management system according to claim 5, wherein the at least one first processor is further configured to:
when a first use request for using the service via the user interface is received from the identified apparatus, transmit the start request including an equipment number associated with the identified apparatus; and
when the instruction to acquire the apparatus information of the identified apparatus based on the equipment number included in the start request is received from the management apparatus, generate the acquisition request command to acquire the apparatus information of the identified apparatus.

10. The remote management system according to claim 9, wherein the at least one first processor is further configured to:
when a second use request for using the service is received via the user interface from the identified apparatus, transmit the response including the acquisition request command in response to the use request.

11. The remote management system according to claim 5, wherein the at least one first processor is further configured to
when the use request for using the service is received via the user interface from the identified apparatus, transmit the response including the use request to the providing source that provides the service.

12. A service providing apparatus enabling access from an apparatus connected to a management apparatus via a network to a providing source that provides a service, comprising:
a memory having computer readable instructions stored thereon; and
at least one processor configured to execute the computer readable instructions to,
receive an instruction, from the management apparatus, to acquire apparatus information of the connected apparatus corresponding to identification information to the service providing apparatus after the identification information is registered in the management apparatus,
generate an acquisition request command based on the received instruction indicating that the connected apparatus is to be managed by the management apparatus is registered in the management apparatus, and
when a use request for using the service is received from the connected apparatus, transmit a response to provide the service in combination with the acquisition request command in response to the use request, and wherein the management apparatus is configured to,
register the apparatus information of the connected apparatus, the apparatus information being transmitted from the connected apparatus to the management apparatus in response to the acquisition request command included in the response, in association with the identification information, and
manage the connected apparatus using the registered apparatus information.

13. The apparatus according to claim 12, wherein the at least one processor is further configured to:
determine whether the apparatus transmitting the use request is the connected apparatus whose apparatus information is to be acquired by the instruction from the management apparatus; and
wherein, when determining that the apparatus transmitting the use request is the connected apparatus whose apparatus information is to be acquired by the instruction from the management apparatus, transmit a response including the acquisition request command in response to the use request.

14. The apparatus according to claim 13, wherein the at least one processor is further configured to:
in response to the use request, transmit the response including a command identifier included in the instruction to acquire the apparatus information from the management apparatus.

15. The apparatus according to claim 12, wherein the at least one processor is further configured to:
when the use request is received from the connected apparatus, transmit the use request to the providing source that provides the service.

* * * * *